US012613396B2

(12) United States Patent
Chang et al.

(10) Patent No.: US 12,613,396 B2
(45) Date of Patent: Apr. 28, 2026

(54) IMAGING LENS ASSEMBLY MODULE, CAMERA MODULE AND ELECTRONIC DEVICE

(71) Applicant: LARGAN PRECISION CO., LTD., Taichung City (TW)

(72) Inventors: Yu-Tzu Chang, Taichung City (TW); Hsiu-Yi Hsiao, Taichung City (TW); Ming-Ta Chou, Taichung City (TW); Te-Sheng Tseng, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 244 days.

(21) Appl. No.: 18/471,424

(22) Filed: Sep. 21, 2023

(65) Prior Publication Data

US 2024/0111133 A1    Apr. 4, 2024

(51) Int. Cl.
*G02B 13/00*        (2006.01)
*G03B 9/06*         (2021.01)

(52) U.S. Cl.
CPC ........... *G02B 13/0075* (2013.01); *G03B 9/06* (2013.01)

(58) Field of Classification Search
CPC ...... G02B 13/0075; G02B 7/02; G02B 7/021; G03B 9/06; G03B 30/00
See application file for complete search history.

(56) References Cited

U.S. PATENT DOCUMENTS

| | | | |
|---|---|---|---|
| 9,019,637 B2 | 4/2015 | Tsai | |
| 10,564,516 B2 | 2/2020 | Lee | |
| 10,571,648 B2 | 2/2020 | Lee | |
| 10,684,442 B2 | 6/2020 | Weng | |
| 10,718,924 B2 | 7/2020 | Chou | |
| 10,848,656 B2 | 11/2020 | Park et al. | |
| 10,969,653 B2 | 4/2021 | Kim | |
| 10,969,654 B2 | 4/2021 | Seo et al. | |
| 11,226,539 B2 | 1/2022 | Jun | |
| 2022/0382128 A1 | 12/2022 | Lee | |

(Continued)

FOREIGN PATENT DOCUMENTS

| | | |
|---|---|---|
| CN | 112099225 A | 12/2020 |
| CN | 108933886 B | 3/2021 |
| CN | 113259545 A | 8/2021 |

(Continued)

*Primary Examiner* — James C. Jones

(74) *Attorney, Agent, or Firm* — McClure, Qualey & Rodack, LLP

(57) ABSTRACT

An imaging lens assembly module includes a lens carrier, a rotatable component, an imaging surface and a holder portion. At least one lens element of the imaging lens assembly module is disposed on the lens carrier, and the lens carrier includes an assembling structure. The rotatable component includes a blade set and a rotating element. The blade set includes rotatable blades surrounding an optical axis to form a through hole. The rotating element is connected to the blade set. The imaging surface is located on an image side of the lens carrier. The holder portion is configured to keep a fixed distance between the lens carrier and the imaging surface. The blade set and the rotating element are disposed on the assembling structure, and the blade set and the rotating element rotate relatively to the assembling structure, so that the dimension of the through hole is variable.

26 Claims, 33 Drawing Sheets

(56)          References Cited

U.S. PATENT DOCUMENTS

2023/0341746 A1 * 10/2023 Chen ........................ G03B 9/06

FOREIGN PATENT DOCUMENTS

CN      110858048  B    11/2021
CN      110579926  B     2/2022
CN      217484662  U     9/2022
KR      102248523  B1    5/2021
TW       M509915   U    10/2015

* cited by examiner

10

110

115

114

O

111

113

112

116

10

210

310

315

314

317

O

311

313

312

316

40

410

421

423

420

423

421

IMAGING LENS ASSEMBLY MODULE, CAMERA MODULE AND ELECTRONIC DEVICE

RELATED APPLICATIONS

This application claims priority to Taiwan Application Serial Number 111137277, filed Sep. 30, 2022, which is herein incorporated by reference.

BACKGROUND

Technical Field

The present disclosure relates to an imaging lens assembly module and a camera module. More particularly, the present disclosure relates to an imaging lens assembly module and a camera module applicable to portable electronic devices.

Description of Related Art

In recent years, portable electronic devices have developed rapidly. For example, intelligent electronic devices and tablets have been filled in the lives of modern people, and camera modules and imaging lens assembly modules mounted on portable electronic devices have also prospered. However, as technology advances, the quality requirements of the imaging lens assembly module are becoming higher and higher. Therefore, an imaging lens assembly module, which can maintain the fixed focus, needs to be developed.

SUMMARY

According to one aspect of the present disclosure, an imaging lens assembly module includes a lens carrier, a rotatable component, an imaging surface and a holder portion. The lens carrier has an optical axis, wherein at least one lens element of the imaging lens assembly module is disposed at the lens carrier, and the lens carrier includes an assembling structure. The rotatable component includes a blade set and a rotating element. The blade set includes a plurality of rotatable blades, wherein all of the rotatable blades surround the optical axis to form a through hole, and a dimension of the through hole is variable. The rotating element is connected to the blade set, and the rotating element is configured to drive the blade set to adjust the dimension of the through hole. The imaging surface is located on an image side of the lens carrier. The holder portion is configured to keep a fixed distance between the lens carrier and the imaging surface. The blade set of the rotatable component and the rotating element are disposed on the assembling structure of the lens carrier, and both of the blade set and the rotating element rotate relatively to the assembling structure, so that the dimension of the through hole is variable. The through hole is disposed on an object side of the lens carrier.

According to one aspect of the present disclosure, a camera module includes the imaging lens assembly module of the aforementioned aspect and an image sensor, wherein the image sensor is corresponding to the imaging surface.

According to one aspect of the present disclosure, a camera module includes an imaging lens assembly module and an electronic module. The imaging lens assembly module includes a lens carrier, a rotatable component, an imaging surface and a holder portion. The lens carrier has an optical axis, wherein at least one lens element of the imaging lens assembly module is disposed at the lens carrier, and the lens carrier includes an assembling structure. The rotatable component includes a blade set and a rotating element. The blade set includes a plurality of rotatable blades, wherein all of the rotatable blades surround the optical axis to form a through hole, and a dimension of the through hole is variable. The rotating element is connected to the blade set, and the rotating element is configured to drive the blade set to adjust the dimension of the through hole. The imaging surface is located on an image side of the lens carrier. The electronic module includes a circuit board and an image sensor, the circuit board is electrically connected to the image sensor, and the image sensor is corresponding to the imaging surface. The blade set of the rotatable component and the rotating element are disposed on the assembling structure of the lens carrier, and both of the blade set and the rotating element rotate relatively to the assembling structure, so that the dimension of the through hole is variable. A fixed distance between the lens carrier and the circuit board is kept via the holder portion.

According to one aspect of the present disclosure, an electronic device includes the camera module of the aforementioned aspect.

DETAILED DESCRIPTION

Figure 1A:
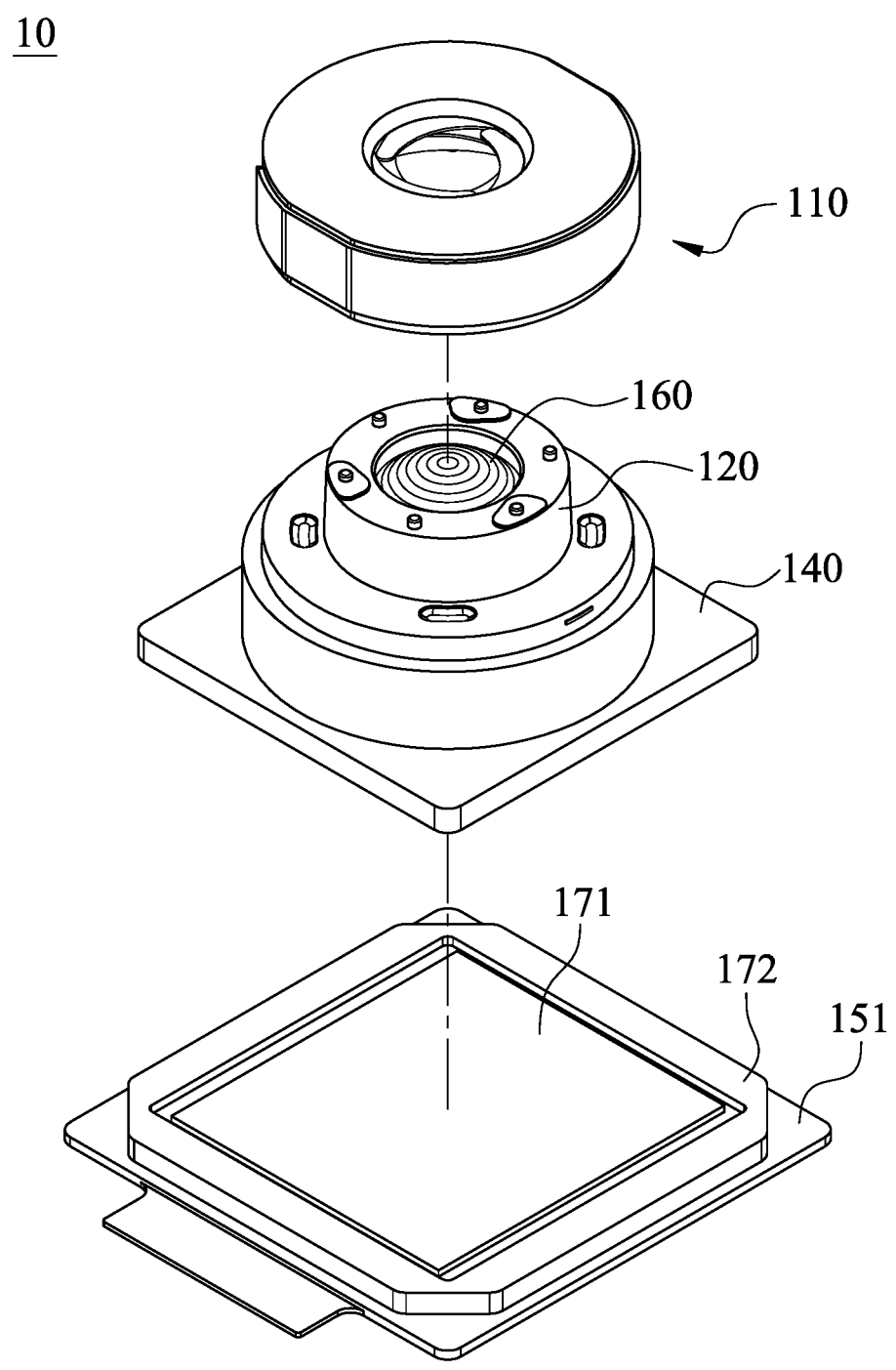
FIG. 1A is an exploded view of a camera module according to the 1st embodiment of the present disclosure.

The present disclosure provides a camera module, which includes an imaging lens assembly module and an electronic module. The imaging lens assembly module includes a lens carrier, a rotatable component, an imaging surface and a holder portion, wherein the imaging surface is located on an image side of the lens carrier, and a fixed distance between the lens carrier and the imaging surface is kept via the holder portion. Moreover, a fixed distance between the lens carrier and the circuit board can be kept via the holder portion, but the present disclosure is not limited thereto. At least one lens element of the imaging lens assembly module is disposed at the lens carrier, the lens carrier has an optical axis, and the lens carrier includes an assembling structure. The rotatable component includes a blade set and a rotating element. The blade set includes a plurality of rotatable blades, wherein all of the rotatable blades surround the optical axis to form a through hole, and a dimension of the through hole is variable. The rotating element is connected to the blade set, and the rotating element is configured to drive the blade set to adjust the dimension of the through hole. The electronic module includes a circuit board and an image sensor, the circuit board is electrically connected to the image sensor, and the image sensor is corresponding to the imaging surface. In particular, when the fixed distance between the lens carrier and the circuit board is kept via the holder portion, the image sensor can move by the way of the sensor shift. The blade set and the rotating element of the rotatable component are disposed on the assembling structure of the lens carrier, and both of the blade set and the rotating element rotate relatively to the assembling structure, so that the dimension of the through hole can be changed. The fixed focus of the imaging lens assembly module can be maintained by keeping the fixed distance between the lens carrier and the imaging surface and the fixed distance between the lens carrier and the circuit board. In particular, the through hole is disposed on the location of the aperture of the imaging lens assembly module, and the through hole can be disposed on an object side of the lens carrier.

The rotatable blades can be disposed on the assembling structure, and the assembling structure can include a plurality of positioning members, wherein each of the positioning members is a protruding structure on the assembling structure parallel to the optical axis, the positioning members are corresponding to the rotatable blades, respectively, and a relative displacement between the rotating element and the positioning members makes the rotatable blades rotate. Therefore, the dimension of the through hole can be accurately controlled.

The lens carrier and the holder portion can be integrally formed, the holder portion is corresponding to the imaging surface, and the holder portion is assembled on the electronic module. Therefore, the assembling process can be simplified so as to enhance the manufacturing efficiency. Or, the lens carrier can be disposed on the holder portion, and the holder portion is corresponding to the imaging surface. In particular, the holder portion has the sufficient supporting characteristic to support the lens carrier so as to keep the structural strength thereof and achieve the condition of the mass production.

The holder portion can include an alignment structure, wherein an alignment between the holder portion and the imaging surface is obtained via the alignment structure. The radial positioning and the axial support between the holder portion and the imaging surface can be more accurate via the design of the alignment structure, so that the image quality of the imaging lens assembly module can be enhanced.

An outer portion of the lens carrier can include the assembling structure, an inner portion of the lens carrier can include a receiving structure, and the imaging lens assembly module can further include a first lens element and a second lens element, wherein both of the first lens element and the second lens element are disposed on the receiving structure, the first lens element is disposed on the receiving structure which is farther away from an upper surface of the imaging surface, and the second lens element is disposed on the receiving structure which is closer to a lower surface of the imaging surface. Therefore, the assembling inaccuracy can be reduced so as to maintain the image quality with higher level. In particular, the manufacturing method can be the technique of the active alignment.

The first lens element can be made of glass material. In particular, the glass material can be a ground glass, a frosted glass, a compound glass, but the present disclosure is not limited thereto.

The rotatable component can further include a magnet and a coil, wherein the coil is corresponding to the magnet, and one of the magnet and the coil is disposed on the rotating element. Furthermore, the displacement of the rotating element relative to the positioning members can be driven via the magnet and the coil.

The rotatable component can further include at least two bearing members, wherein the bearing members are disposed between the rotating element and the lens carrier for supporting the rotating element to rotate, and the bearing members are aligned to the optical axis for aligning to the rotating element and the lens carrier. In detail, each of the bearing members can be a ball element, and the bearing members are aligned to the optical axis so as to align the rotating element and the lens carrier, so that the rotating stability of the rotating element can be enhanced.

Each of the bearing members can include four contacted points physically contacted with the rotating element or the lens carrier, wherein the contacted points include an inner contacted point, an outer contacted point, an upper contacted point and a lower contacted point. Moreover, the inner contacted point is one of the contacted points closest to the optical axis, the outer contacted point is one of the contacted points farthest away from the optical axis, the upper contacted point is one of two of the contacted points farthest away on a direction parallel to the optical axis, and the lower contacted point is the other one of the two of the contacted points farthest away on the direction parallel to the optical axis. In particular, the positioning alignment between the rotating element and the lens carrier can be obtained via the bearing members, so that the positioning between the elements can be maintained via the bearing members during the rotating process. Hence, the radial positioning between the rotating element and the lens carrier can be obtained via the inner contacted point and the outer contacted point, and the axial positioning between the rotating element and the lens carrier can be obtained via the upper contacted point and the lower contacted point.

When along a direction vertical to the optical axis, a distance between the inner contacted point and the outer contacted point is Dt, and a distance between the inner contacted point and the lower contacted point is Di, the following condition can be satisfied: $0.3 \leq Di/Dt \leq 0.7$. Therefore, the force balance of the rotating element can be obtained so as to maintain the dynamic stability.

Or, each of the bearing members can include three contacted points physically contacted with the rotating element or the lens carrier, wherein the contacted points include an inner contacted point, an outer contacted point, an upper contacted point and a lower contacted point. Moreover, the inner contacted point is one of the contacted points closest to the optical axis, the outer contacted point is one of the contacted points farthest away from the optical axis, the upper contacted point is one of two of the contacted points farthest away on a direction parallel to the optical axis, and the lower contacted point is the other one of the two of the contacted points farthest away on the direction parallel to the optical axis, wherein one of the contacted points is simultaneously one of the inner contacted point and the outer contacted point and one of the upper contacted point and the lower contacted point. Hence, the radial positioning and the axial supporting between the rotating element and the lens carrier can be more accurate via the design of the position of the different contacted points, so that the image quality of the imaging lens assembly module can be enhanced.

When along a direction vertical to the optical axis, a distance between the inner contacted point and the outer contacted point is Dt, and a distance between a remaining one of the contacted points and the inner contacted point is Di', the following condition can be satisfied: $0.3 \leq Di'/Dt \leq 0.7$. Therefore, the force balance of the rotating element can be obtained so as to maintain the dynamic stability.

A number of the bearing members can be no larger than five. Therefore, the yield rate of the manufacturing can be kept.

When a height of the lens carrier is Db, and a distance between the lens carrier and the imaging surface is Ds, the following condition can be satisfied: $1.5 < Db/Ds \leq 30.7$. In detail, the distance between the lens carrier and the imaging surface is the back focal length of the imaging lens assembly module. Hence, the image quality with higher level can be maintained by keeping a fixed proportion between the height of the lens carrier and the back focal distance.

When an aperture value of the imaging lens assembly module is FNO, the following condition can be satisfied: $0.9 \leq FNO \leq 5.6$. Hence, the aperture value of the imaging lens assembly module can be corresponding to the different capturing environments by changing the dimension of the through hole.

When a maximum field of view of the imaging lens assembly module is FOV, the following condition can be satisfied: 50 degrees≤FOV≤105 degrees. Hence, the dimension of the through hole can be controlled via the proper maximum field of view.

Each of the aforementioned features of the camera module can be utilized in various combinations for achieving the corresponding effects.

The present disclosure provides an electronic device, which includes the aforementioned camera module.

According to the aforementioned embodiment, specific embodiments and examples are provided, and illustrated via figures.

1st Embodiment

FIG. 1A is an exploded view of a camera module 10 according to the 1st embodiment of the present disclosure. In FIG. 1A, the camera module 10 includes an imaging lens assembly module (its reference numeral is omitted) and an electronic module 150 (labeled in FIG. 1F), wherein the imaging lens assembly module includes a rotatable component 110, a lens carrier 120, an imaging surface 130 (labeled in FIG. 1F), a holder portion 140, at least one lens element 160, a filter 171 and a filter holder 172, wherein the imaging surface 130 is located on an image side of the lens carrier 120, and a fixed distance between the lens carrier 120 and the imaging surface 130 is kept via the holder portion 140, so that the fixed focus of the imaging lens assembly module can be maintained.

Figure 1B:
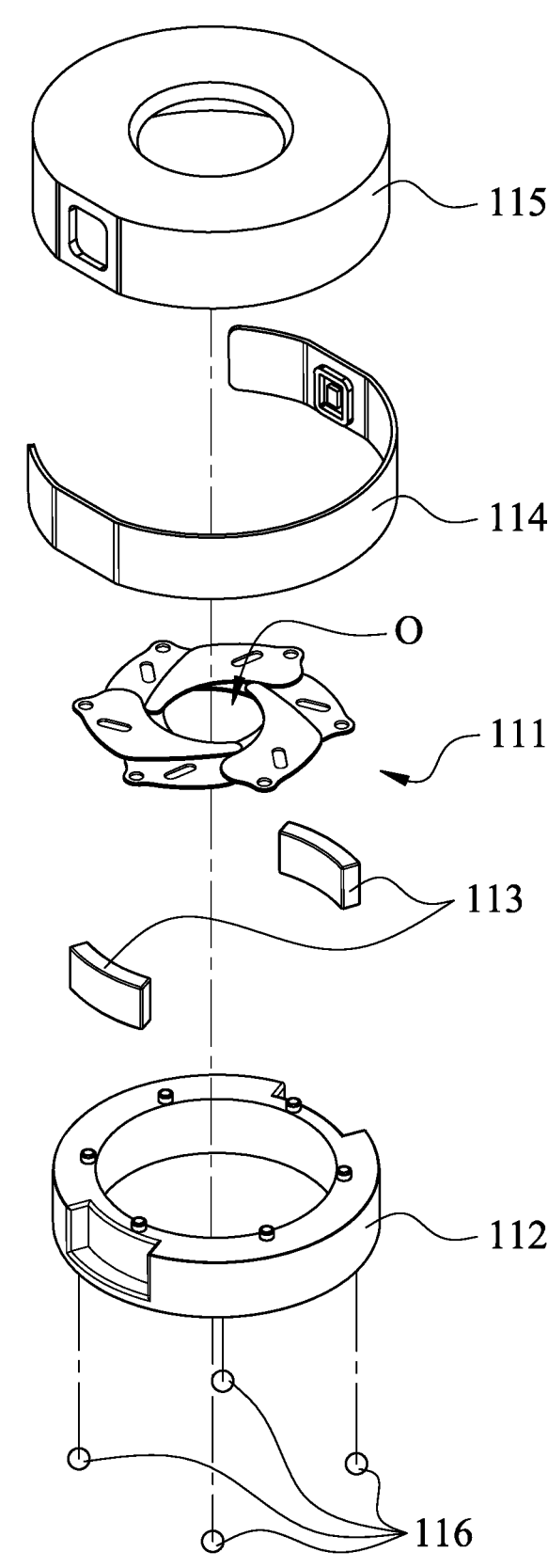
FIG. 1B is an exploded view of the rotatable component according to the 1st embodiment in FIG. 1A.

FIG. 1B is an exploded view of the rotatable component 110 according to the 1st embodiment in FIG. 1A. In FIG. 1B, the rotatable component 110 includes a blade set 111, a rotating element 112, a plurality of magnets 113, a coil 114, a fixer 115 and a plurality of bearing members 116, wherein a number of the magnets 113 is two, and a number of the bearing members 116 is four. Moreover, the blade set 111 includes a plurality of rotatable blades (their reference numerals are omitted), wherein all of the rotatable blades surround an optical axis X (labeled in FIG. 1C) to form a through hole O, and a dimension of the through hole O is variable. The rotating element 112 is connected to the blade set 111, and the rotating element 112 is configured to drive the blade set 111 to adjust the dimension of the through hole O. The coil 114 is corresponding to the magnets 113, and the magnets 113 are disposed on the rotating element 112. The fixer 115 is configured to accommodate the blade set 111, the rotating element 112 and the magnets 113, and the coil 114 is disposed on an outer surface of the fixer 115. The bearing members 116 are disposed between the rotating element 112 and the lens carrier 120 for supporting the rotating element 112 to rotate, and the bearing members 116 are aligned to the optical axis X for aligning to the rotating element 112 and the lens carrier 120, wherein each of the bearing members 116 can be a ball element, and the bearing members 116 are aligned to the optical axis X so as to align the rotating element 112 and the lens carrier 120, so that the rotating stability of the rotating element 112 can be enhanced. Moreover, the through hole O is disposed on the location of the aperture of the imaging lens assembly module.

Figure 1C:
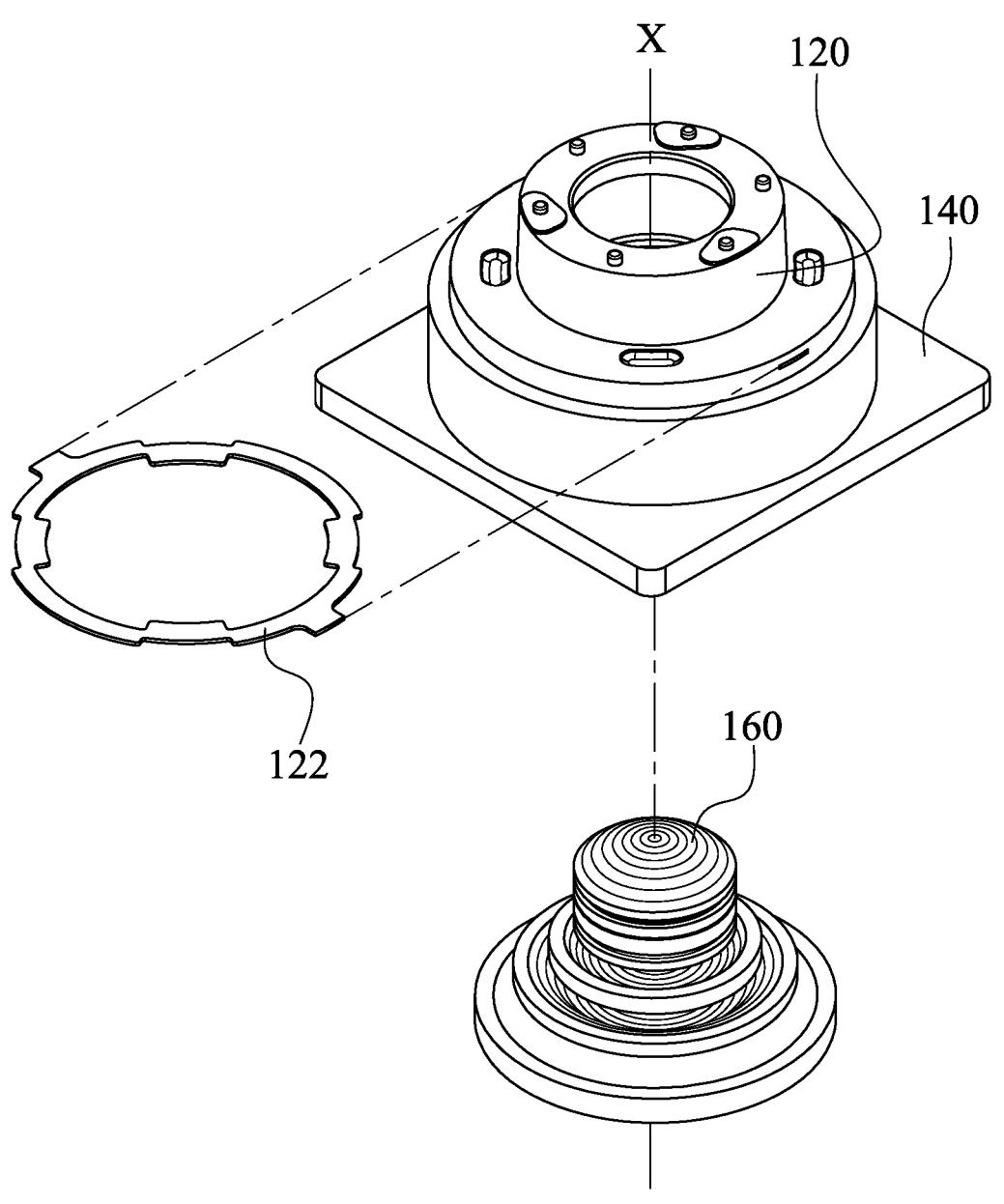
FIG. 1C is a schematic view of the lens carrier, the lens element and the holder portion according to the 1st embodiment in FIG. 1A.
Figure 1D:
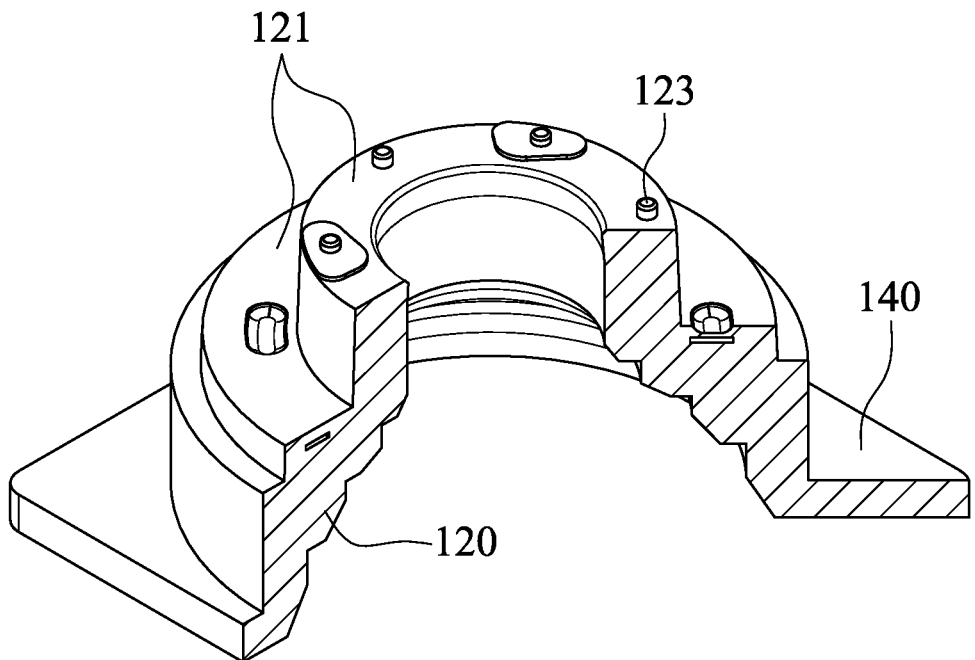
FIG. 1D is a partial cross-sectional view of the lens carrier and the holder portion according to the 1st embodiment in FIG. 1A.
Figure 1E:
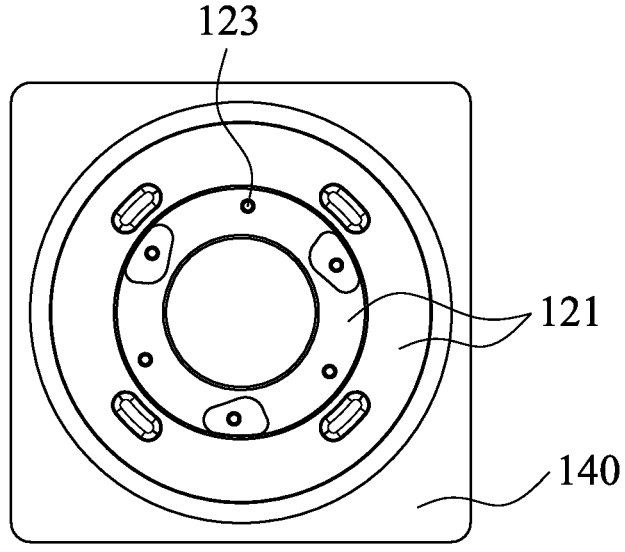
FIG. 1E is a top view of the lens carrier and the holder portion according to the 1st embodiment in FIG. 1A.

FIG. 1C is a schematic view of the lens carrier 120, the lens element 160 and the holder portion 140 according to the 1st embodiment in FIG. 1A. FIG. 1D is a partial cross-sectional view of the lens carrier 120 and the holder portion 140 according to the 1st embodiment in FIG. 1A. FIG. 1E is a top view of the lens carrier 120 and the holder portion 140 according to the 1st embodiment in FIG. 1A. In FIGS. 1A and 1C to 1E, the lens element 160 is disposed at the lens carrier 120, the lens carrier 120 has the optical axis X, and the lens carrier 120 includes an assembling structure 121 and a magnetic member 122, wherein the blade set 111 and the rotating element 112 of the rotatable component 110 are disposed on the assembling structure 121 of the lens carrier 120, and both of the blade set 111 and the rotating element 112 rotate relatively to the assembling structure 121, so that the dimension of the through hole O can be changed; the magnetic member 122 can be insert molded in the lens carrier 120, but the present disclosure is not limited thereto.

Moreover, the rotatable blades are disposed on the assembling structure 121, and the assembling structure 121 can include a plurality of positioning members 123, wherein each of the positioning members 123 is a protruding structure on the assembling structure 121 parallel to the optical axis X, the positioning members 123 are corresponding to the rotatable blades, respectively, and a relative displacement between the rotating element 112 and the positioning members 123 makes the rotatable blades rotate. Therefore, the dimension of the through hole O can be accurately controlled. Moreover, the displacement of the rotating element 112 relative to the positioning members 123 can be driven via the magnets 113 and the coil 114.

The lens carrier 120 and the holder portion 140 can be integrally formed, the lens carrier 120 is corresponding to the imaging surface 130, and the lens carrier 120 and the holder portion 140 are assembled on the electronic module 150. Therefore, the assembling process can be simplified so as to enhance the manufacturing efficiency.

Figure 1F:
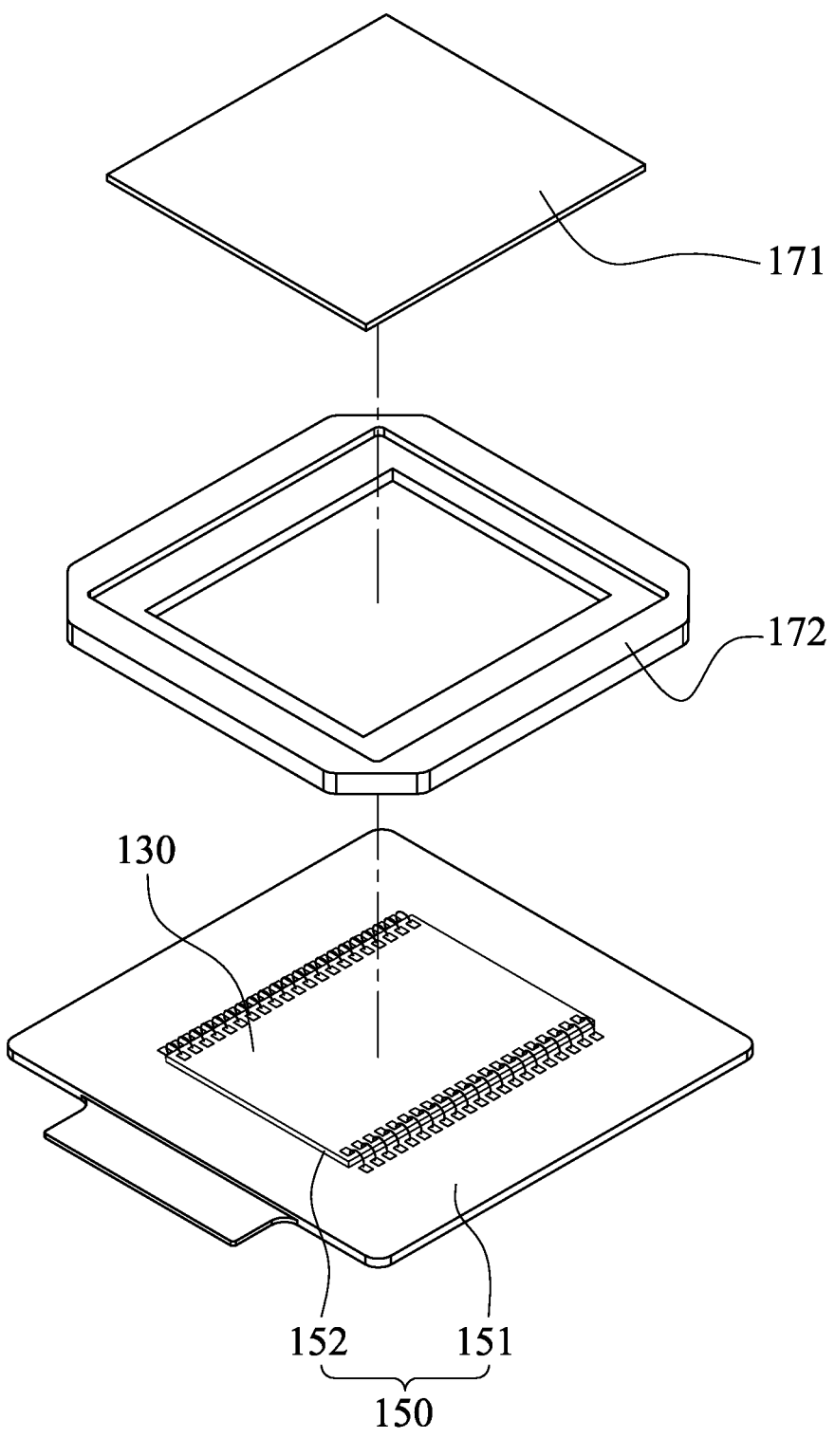
FIG. 1F is a schematic view of the filter, the filter holder, the imaging surface and the electronic module according to the 1st embodiment in FIG. 1A.
Figure 1G:
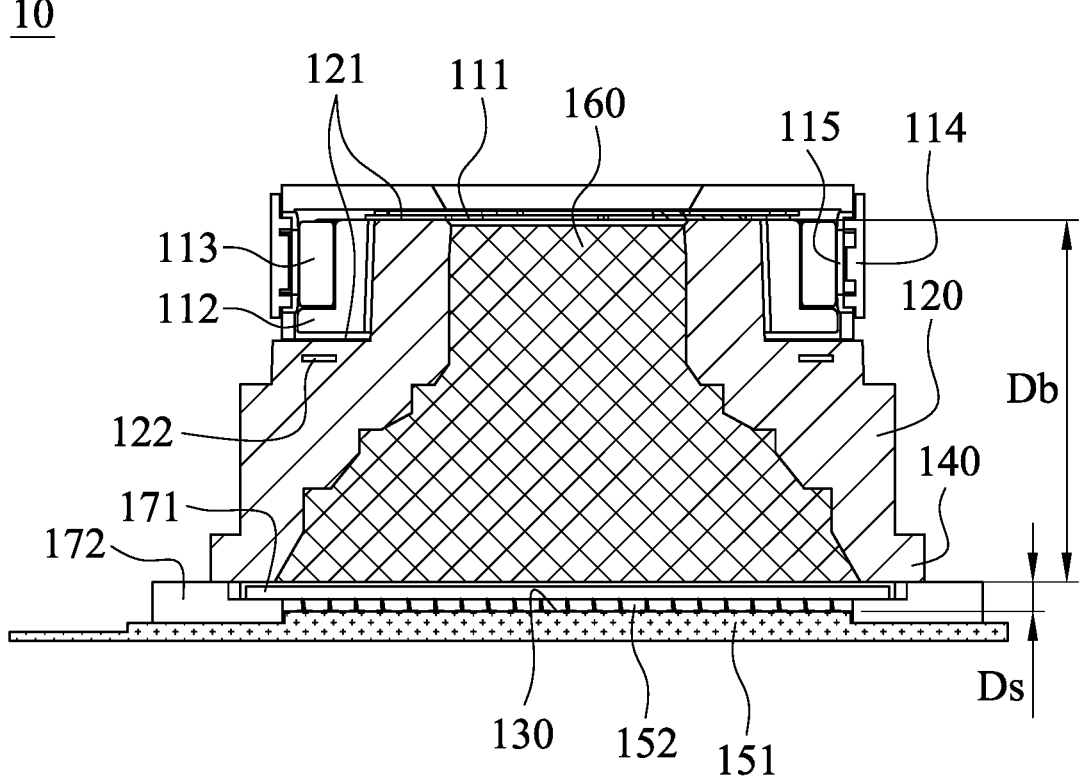
FIG. 1G is a cross-sectional view of the camera module according to the 1st embodiment in FIG. 1A.

FIG. 1F is a schematic view of the filter 171, the filter holder 172, the imaging surface 130 and the electronic module 150 according to the 1st embodiment in FIG. 1A. FIG. 1G is a cross-sectional view of the camera module 10 according to the 1st embodiment in FIG. 1A. In FIGS. 1F and 1G, the filter 171 is disposed on the filter holder 172, the filter holder 172 is disposed on the electronic module 150, and the electronic module 150 includes a circuit board 151 and an image sensor 152. Further, the circuit board 151 is electrically connected to the image sensor 152, the image sensor 152 is corresponding to the imaging surface 130, the filter holder 172 is further disposed on the circuit board 151, and a fixed distance between the lens carrier 120 and the circuit board 151 can be kept via the holder portion 140.

In FIG. 1G, when a height of the lens carrier 120 is Db, and a distance between the lens carrier 120 and the imaging surface 130 is Ds, Db/Ds is 12.28.

Further, when an aperture value of the imaging lens assembly module is FNO, and a maximum field of view of the imaging lens assembly module is FOV, the following conditions can be satisfied: $0.9 \leq FNO \leq 5.6$; and 50 degrees $\leq FOV \leq 105$ degrees.

2nd Embodiment

Figure 2A:
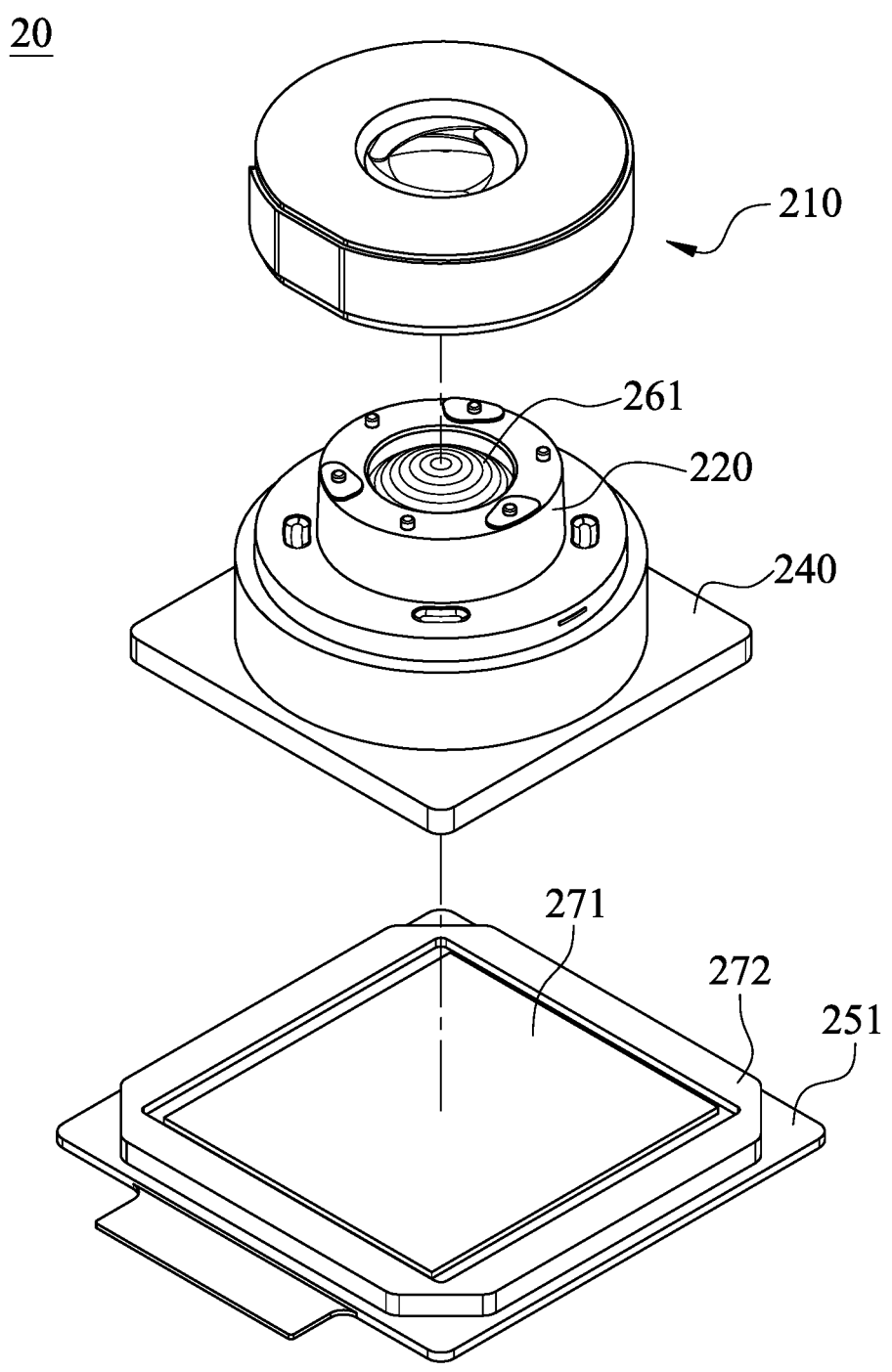
FIG. 2A is an exploded view of a camera module according to the 2nd embodiment of the present disclosure.

FIG. 2A is an exploded view of a camera module 20 according to the 2nd embodiment of the present disclosure. In FIG. 2A, the camera module 20 includes an imaging lens assembly module (its reference numeral is omitted) and an electronic module 250 (labeled in FIG. 2G), wherein the imaging lens assembly module includes a rotatable component 210, a lens carrier 220, an imaging surface 230 (labeled in FIG. 2G), a holder portion 240, a first lens element 261, a second lens element 262 (labeled in FIG. 2C), a filter 271 and a filter holder 272, wherein the imaging surface 230 is located on an image side of the lens carrier 220, and a fixed distance between the lens carrier 220 and the imaging surface 230 is kept via the holder portion 240, so that the fixed focus of the imaging lens assembly module can be maintained. In particular, the first lens element 261 can be made of glass material, wherein the glass material can be a ground glass, a frosted glass, a compound glass, but the present disclosure is not limited thereto.

Figure 2B:
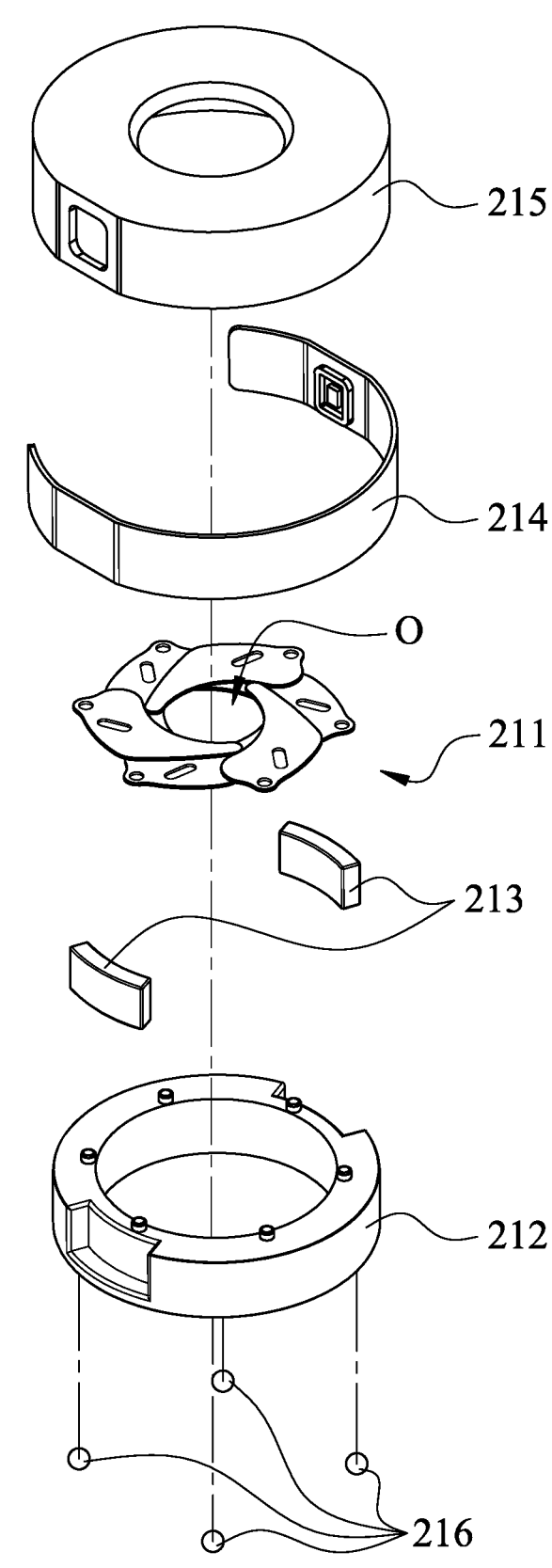
FIG. 2B is an exploded view of the rotatable component according to the 2nd embodiment in FIG. 2A.

FIG. 2B is an exploded view of the rotatable component 210 according to the 2nd embodiment in FIG. 2A. In FIG. 2B, the rotatable component 210 includes a blade set 211, a rotating element 212, a plurality of magnets 213, a coil 214, a fixer 215 and a plurality of bearing members 216, wherein a number of the magnets 213 is two, and a number of the bearing members 216 is four. Moreover, the blade set 211 includes a plurality of rotatable blades (their reference numerals are omitted), wherein all of the rotatable blades surround an optical axis X (labeled in FIG. 2D) to form a through hole O, and a dimension of the through hole O is variable. The rotating element 212 is connected to the blade set 211, and the rotating element 212 is configured to drive the blade set 211 to adjust the dimension of the through hole O. The coil 214 is corresponding to the magnets 213, and the magnets 213 are disposed on the rotating element 212. The fixer 215 is configured to accommodate the blade set 211, the rotating element 212 and the magnets 213, and the coil 214 is disposed on an outer surface of the fixer 215. The bearing members 216 are disposed between the rotating element 212 and the lens carrier 220 for supporting the rotating element 212 to rotate, and the bearing members 216 are aligned to the optical axis X for aligning to the rotating element 212 and the lens carrier 220, wherein each of the bearing members 216 can be a ball element, and the bearing members 216 are aligned to the optical axis X so as to align the rotating element 212 and the lens carrier 220, so that the rotating stability of the rotating element 212 can be enhanced. Moreover, the through hole O is disposed on the location of the aperture of the imaging lens assembly module.

Figure 2C:
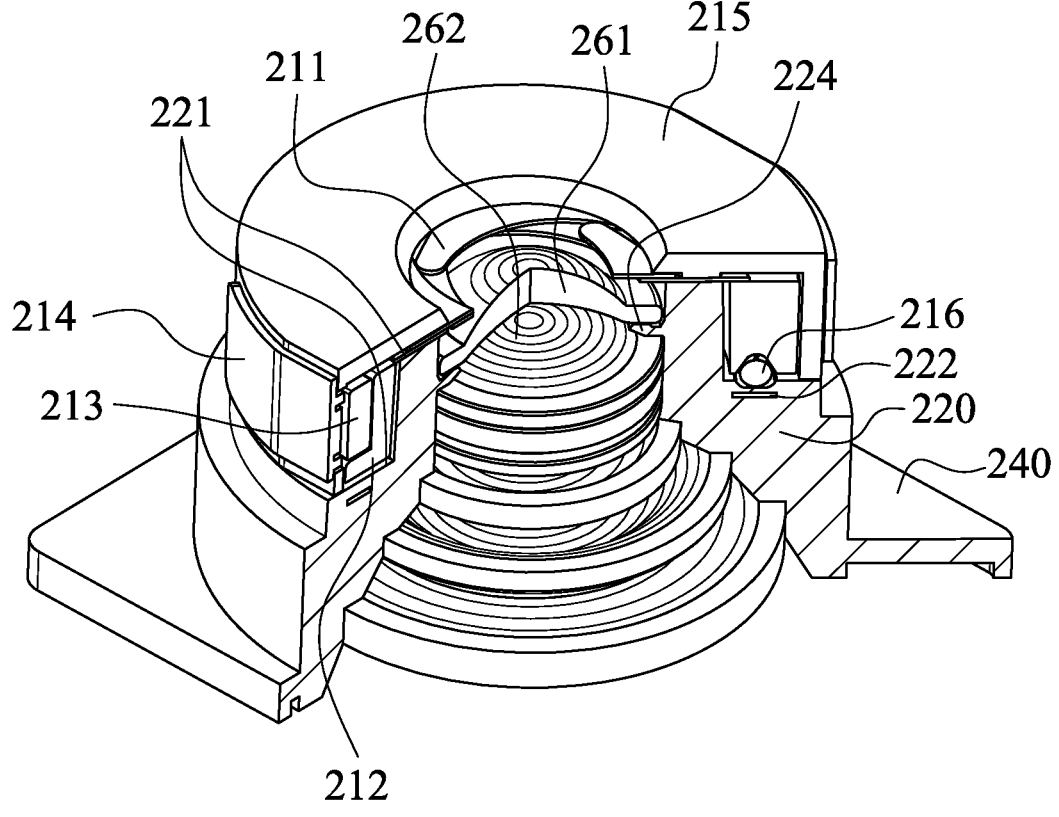
FIG. 2C is a partial cross-sectional view of the camera module according to the 2nd embodiment in FIG. 2A.
Figure 2D:
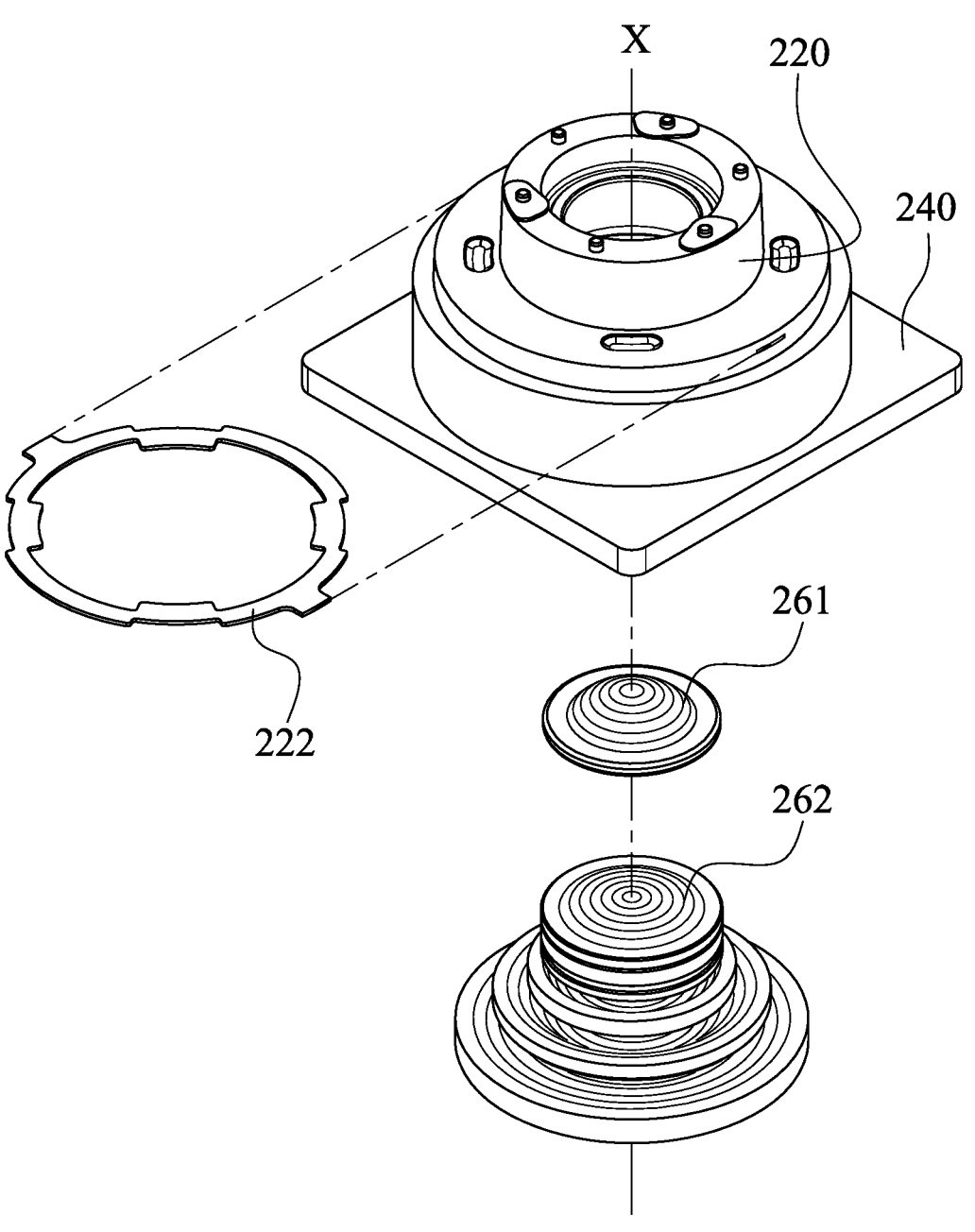
FIG. 2D is a schematic view of the lens carrier, the first lens element, the second lens element and the holder portion according to the 2nd embodiment in FIG. 2A.
Figure 2E:
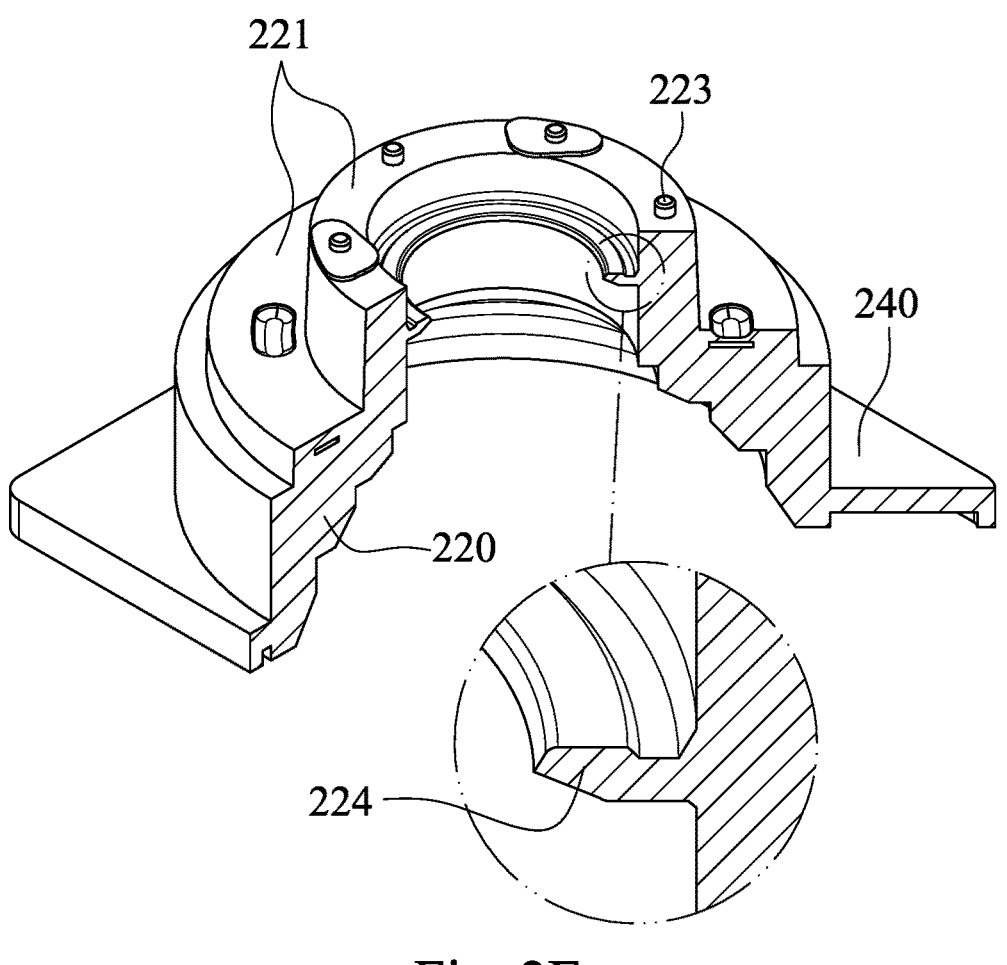
FIG. 2E is a partial cross-sectional view of the lens carrier and the holder portion according to the 2nd embodiment in FIG. 2A.
Figure 2F:
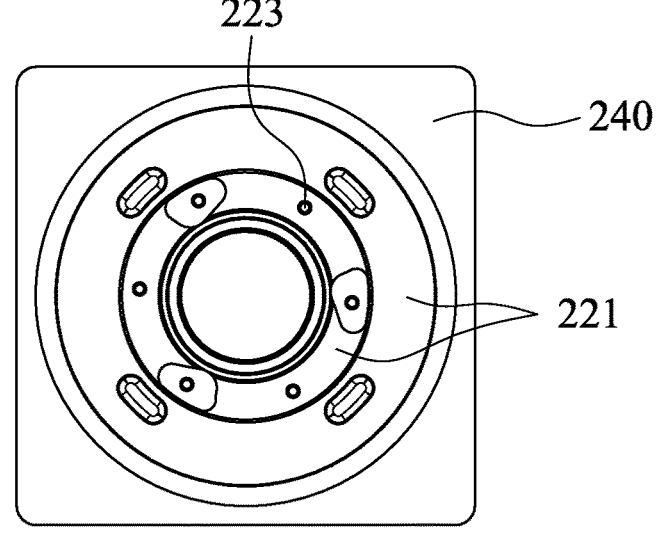
FIG. 2F is a top view of the lens carrier and the holder portion according to the 2nd embodiment in FIG. 2A.

FIG. 2C is a partial cross-sectional view of the camera module 20 according to the 2nd embodiment in FIG. 2A. FIG. 2D is a schematic view of the lens carrier 220, the first lens element 261, the second lens element 262 and the holder portion 240 according to the 2nd embodiment in FIG. 2A. FIG. 2E is a partial cross-sectional view of the lens carrier 220 and the holder portion 240 according to the 2nd embodiment in FIG. 2A. FIG. 2F is a top view of the lens carrier 220 and the holder portion 240 according to the 2nd embodiment in FIG. 2A. In FIGS. 2C to 2F, the first lens element 261 and the second lens element 262 are disposed at the lens carrier 220, the lens carrier 220 has the optical axis X, and the lens carrier 220 includes an assembling structure 221, a magnetic member 222 and a receiving structure 224, wherein the blade set 211 and the rotating element 212 of the rotatable component 210 are disposed on the assembling structure 221 of the lens carrier 220, and both of the blade set 211 and the rotating element 212 rotate relatively to the assembling structure 221, so that the dimension of the through hole O can be changed; the magnetic member 222 can be insert molded in the lens carrier 220, but the present disclosure is not limited thereto.

Moreover, the rotatable blades are disposed on the assembling structure 221, and the assembling structure 221 can include a plurality of positioning members 223, wherein each of the positioning members 223 is a protruding structure on the assembling structure 221 parallel to the optical axis X, the positioning members 223 are corresponding to the rotatable blades, respectively, and a relative displacement between the rotating element 212 and the positioning members 223 makes the rotatable blades rotate. Therefore, the dimension of the through hole O can be accurately controlled. Moreover, the displacement of the rotating element 212 relative to the positioning members 223 can be driven via the magnets 213 and the coil 214.

The lens carrier 220 and the holder portion 240 can be integrally formed, the lens carrier 220 is corresponding to the imaging surface 230, and the lens carrier 220 and the holder portion 240 are assembled on the electronic module 250. Therefore, the assembling process can be simplified so as to enhance the manufacturing efficiency.

In FIGS. 2C and 2E, an outer portion of the lens carrier 220 includes the assembling structure 221, an inner portion of the lens carrier 220 includes a receiving structure 224, wherein both of the first lens element 261 and the second lens element 262 are disposed on the receiving structure 224, the first lens element 261 is disposed on the receiving structure 224 which is farther away from an upper surface of the imaging surface 230, and the second lens element 262 is disposed on the receiving structure 224 which is closer to a lower surface of the imaging surface 230. Therefore, the assembling inaccuracy can be reduced so as to maintain the image quality with higher level. In particular, the manufacturing method can be the technique of the active alignment.

Figure 2G:
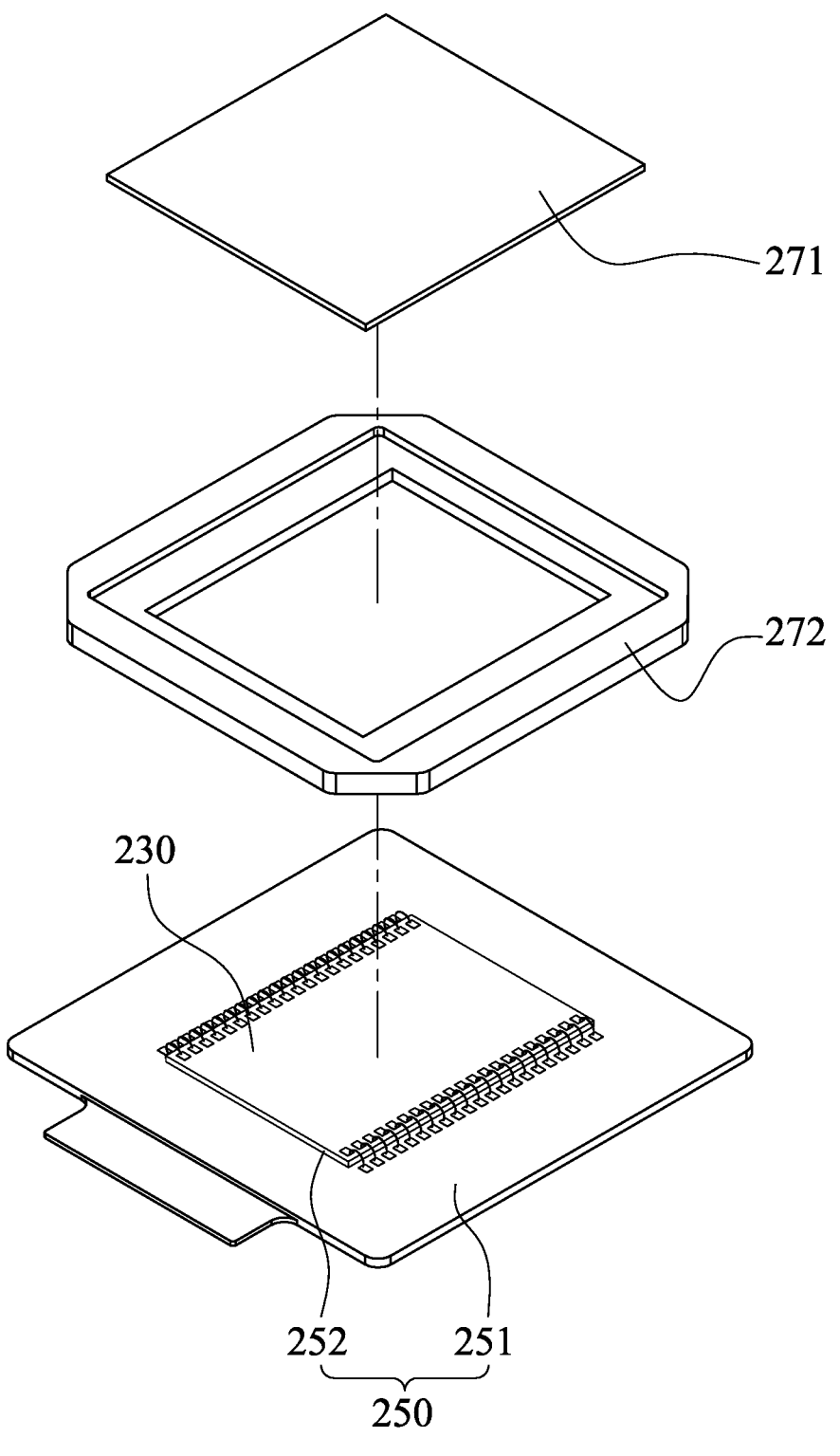
FIG. 2G is a schematic view of the filter, the filter holder, the imaging surface and the electronic module according to the 2nd embodiment in FIG. 2A.
Figure 2H:
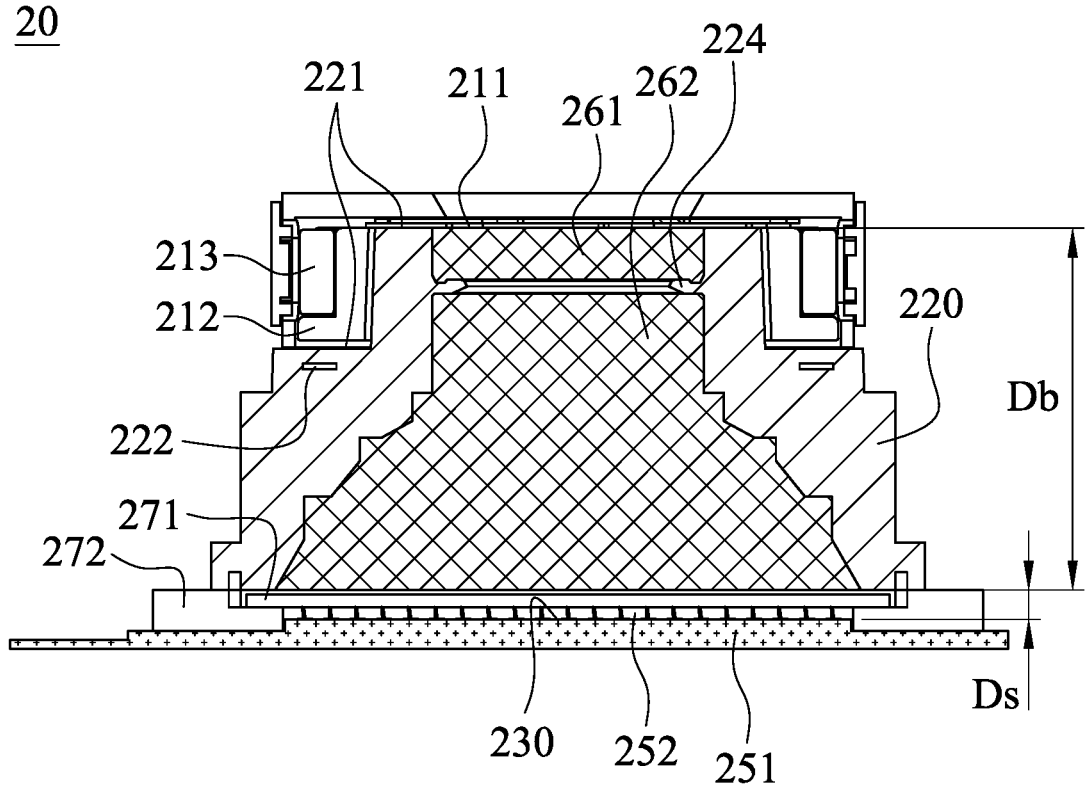
FIG. 2H is a cross-sectional view of the camera module according to the 2nd embodiment in FIG. 2A.

FIG. 2G is a schematic view of the filter 271, the filter holder 272, the imaging surface 230 and the electronic module 250 according to the 2nd embodiment in FIG. 2A. FIG. 2H is a cross-sectional view of the camera module 20 according to the 2nd embodiment in FIG. 2A. In FIGS. 2G and 2H, the filter 271 is disposed on the filter holder 272, the filter holder 272 is disposed on the electronic module 250, and the electronic module 250 includes a circuit board 251 and an image sensor 252. Further, the circuit board 251 is electrically connected to the image sensor 252, the image sensor 252 is corresponding to the imaging surface 230, the filter holder 272 is further disposed on the circuit board 251, and a fixed distance between the lens carrier 220 and the circuit board 251 can be kept via the holder portion 240.

In FIG. 2H, when a height of the lens carrier 220 is Db, and a distance between the lens carrier 220 and the imaging surface 230 is Ds, Db/Ds is 12.28.

3rd Embodiment

Figure 3A:
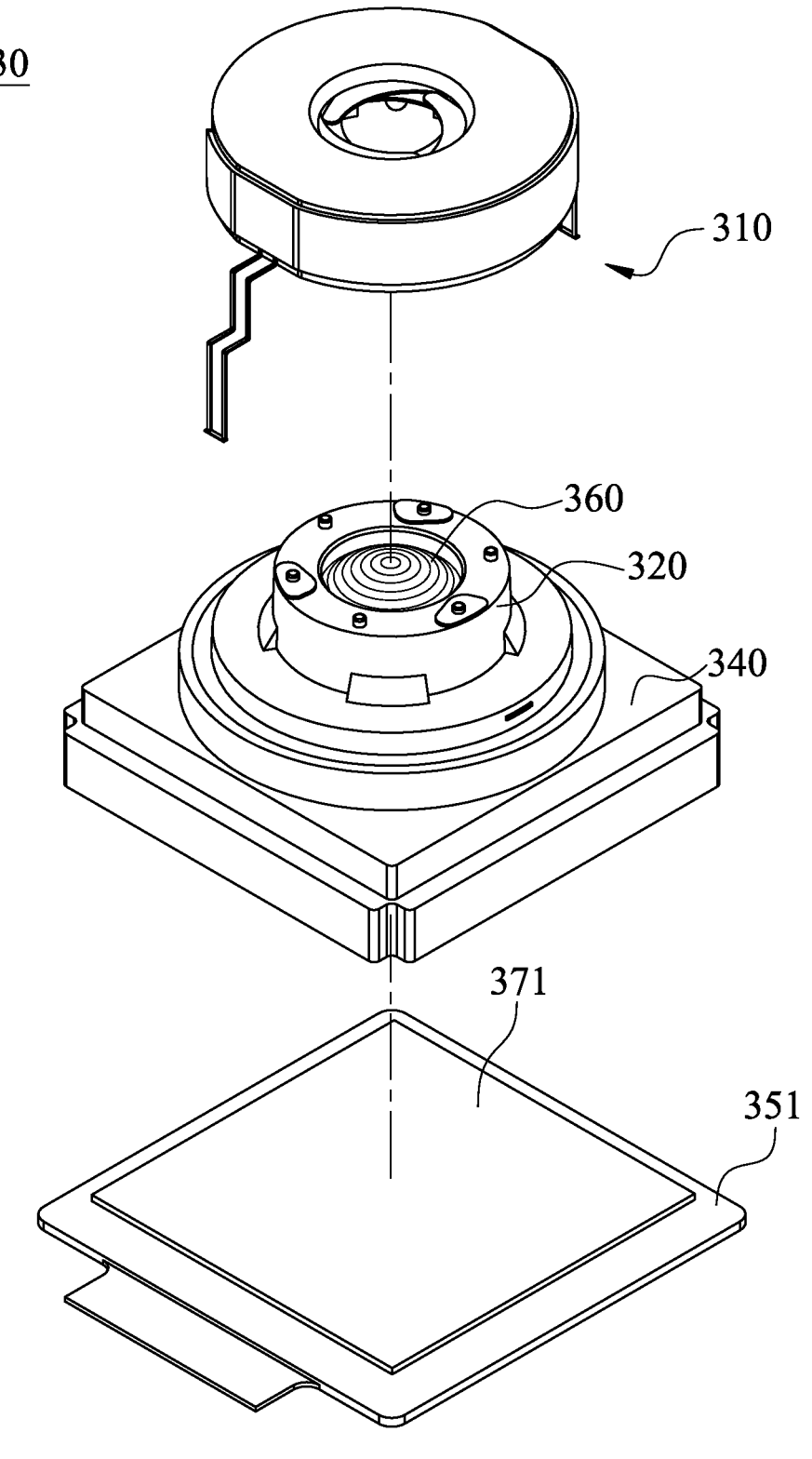
FIG. 3A is an exploded view of a camera module according to the 3rd embodiment of the present disclosure.

FIG. 3A is an exploded view of a camera module 30 according to the 3rd embodiment of the present disclosure. In FIG. 3A, the camera module 30 includes an imaging lens assembly module (its reference numeral is omitted) and an electronic module 350 (labeled in FIG. 3H), wherein the imaging lens assembly module includes a rotatable component 310, a lens carrier 320, an imaging surface 330 (labeled in FIG. 3H), a holder portion 340, at least one lens element 360 and a filter 371, wherein the imaging surface 330 is located on an image side of the lens carrier 320, and a fixed distance between the lens carrier 320 and the imaging surface 330 is kept via the holder portion 340, so that the fixed focus of the imaging lens assembly module can be maintained.

Figure 3B:
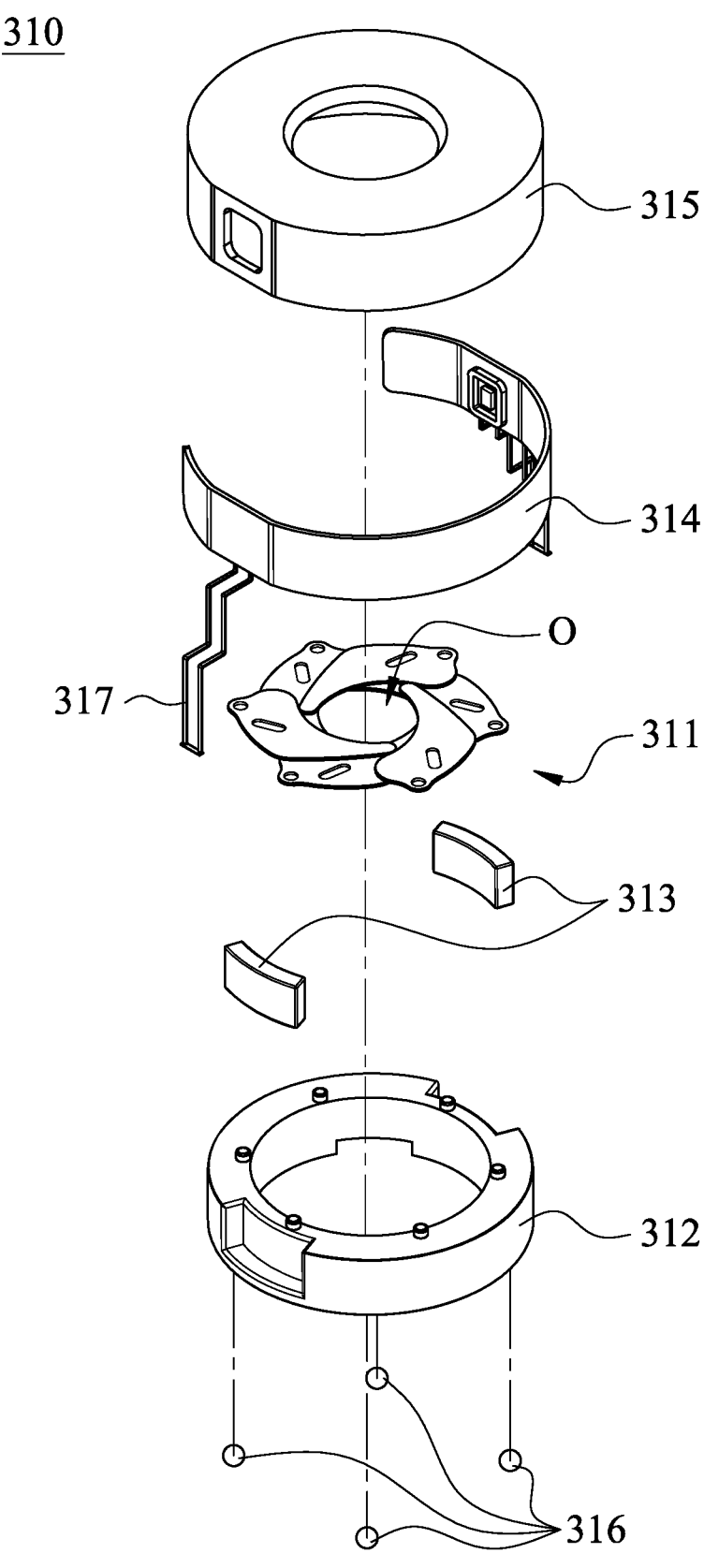
FIG. 3B is an exploded view of the rotatable component according to the 3rd embodiment in FIG. 3A.
Figure 3C:
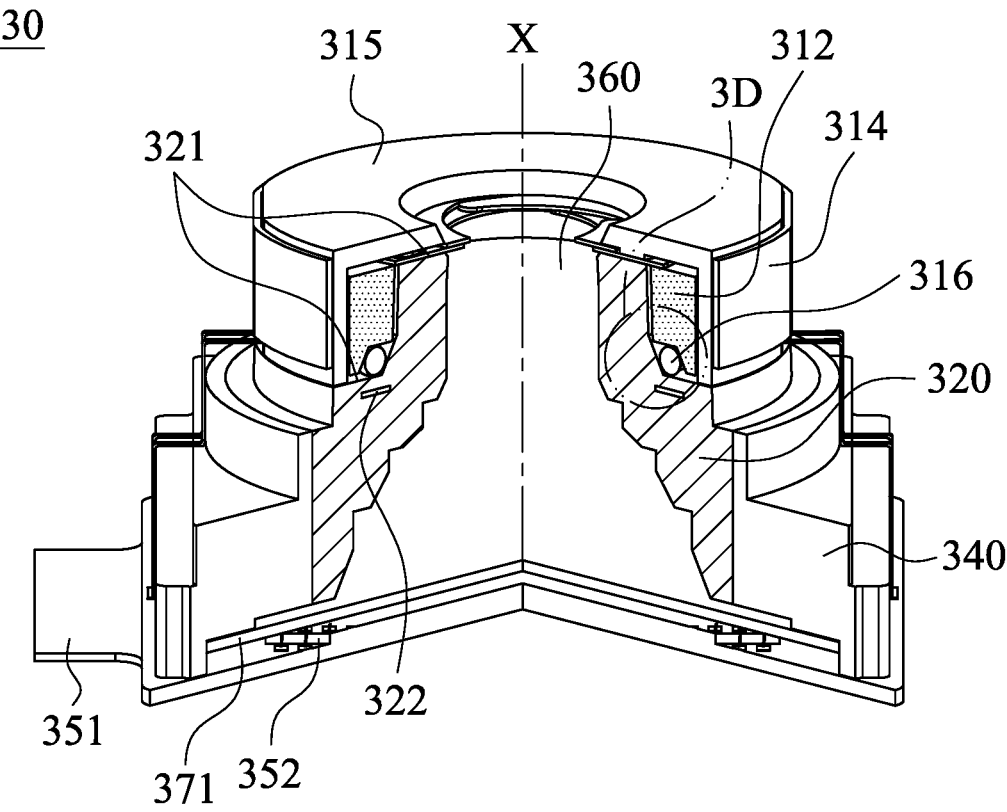
FIG. 3C is a partial cross-sectional view of the camera module according to the 3rd embodiment in FIG. 3A.
Figure 3D:
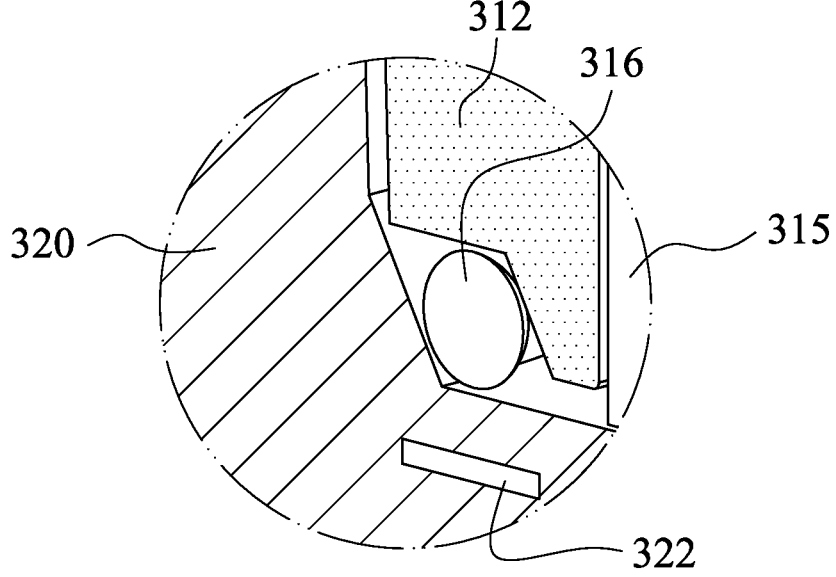
FIG. 3D is a partial enlarged view of the camera module according to the 3rd embodiment in FIG. 3C.

FIG. 3B is an exploded view of the rotatable component 310 according to the 3rd embodiment in FIG. 3A. FIG. 3C is a partial cross-sectional view of the camera module 30 according to the 3rd embodiment in FIG. 3A. FIG. 3D is a partial enlarged view of the camera module 30 according to the 3rd embodiment in FIG. 3C. In FIGS. 3B to 3D, the rotatable component 310 includes a blade set 311, a rotating element 312, a plurality of magnets 313, a coil 314, a fixer 315, a plurality of bearing members 316 and a plurality of conductive wires 317, wherein a number of the magnets 313 is two, and a number of the bearing members 316 is four. Moreover, the blade set 311 includes a plurality of rotatable blades (their reference numerals are omitted), wherein all of the rotatable blades surround an optical axis X to form a through hole O, and a dimension of the through hole O is variable. The rotating element 312 is connected to the blade set 311, and the rotating element 312 is configured to drive the blade set 311 to adjust the dimension of the through hole O. The coil 314 is corresponding to the magnets 313, and the magnets 313 are disposed on the rotating element 312. The fixer 315 is configured to accommodate the blade set 311, the rotating element 312 and the magnets 313, and the coil 314 is disposed on an outer surface of the fixer 315. The bearing members 316 are disposed between the rotating element 312 and the lens carrier 320 for supporting the rotating element 312 to rotate, and the bearing members 316 are aligned to the optical axis X for aligning to the rotating element 312 and the lens carrier 320, wherein each of the bearing members 316 can be a ball element, and the bearing members 316 are aligned to the optical axis X so as to align the rotating element 312 and the lens carrier 320, so that the rotating stability of the rotating element 312 can be enhanced. The coil 314 is electrically connected to the electronic module 350 via the conductive wire 317, wherein the conductive wire 317 can be made by the laser direct structuring (LDS), the insert molding, but the present disclosure is not limited thereto. Moreover, the through hole O is disposed on the location of the aperture of the imaging lens assembly module.

Figure 3E:
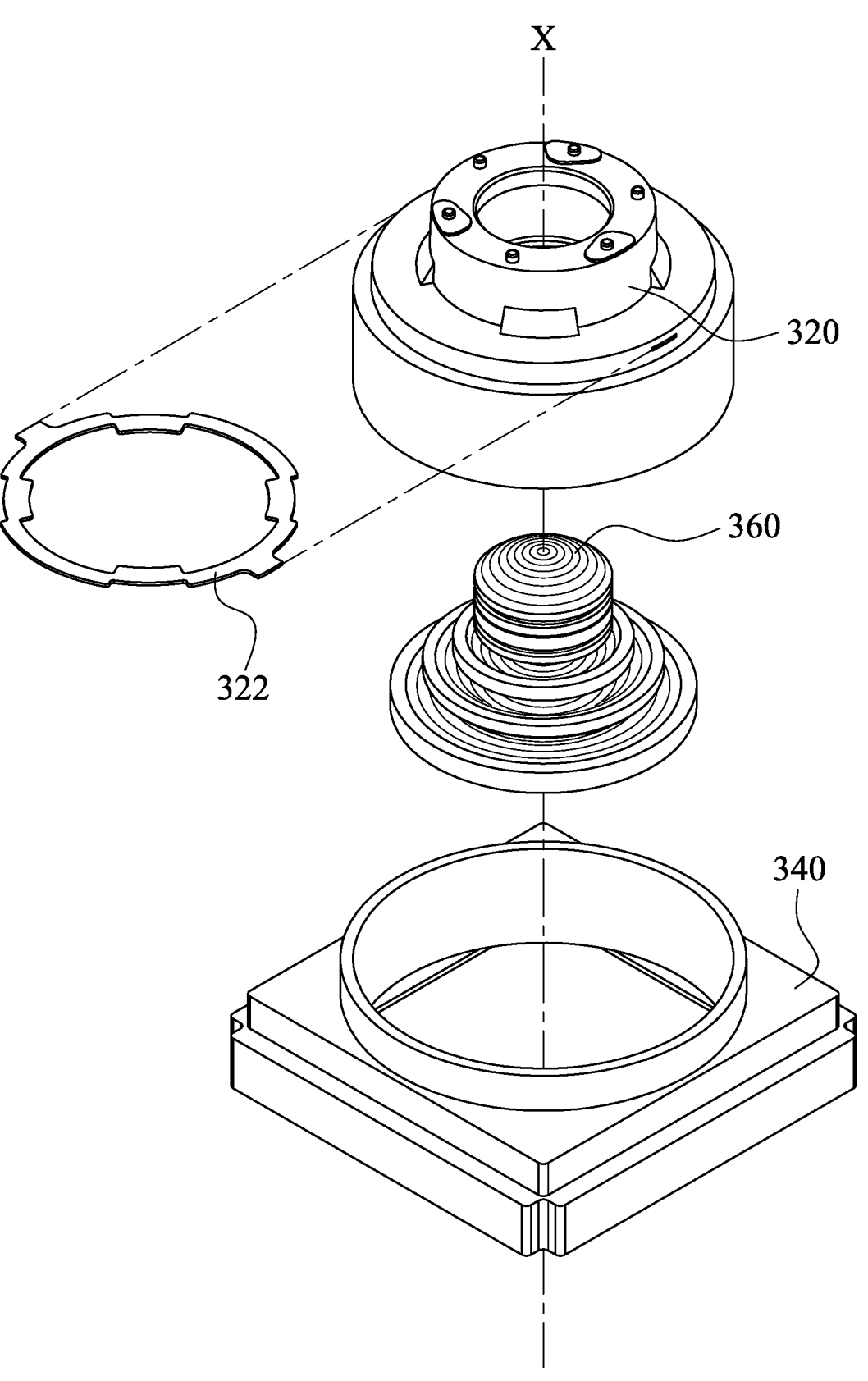
FIG. 3E is a schematic view of the lens carrier, the lens element and the holder portion according to the 3rd embodiment in FIG. 3A.
Figure 3F:
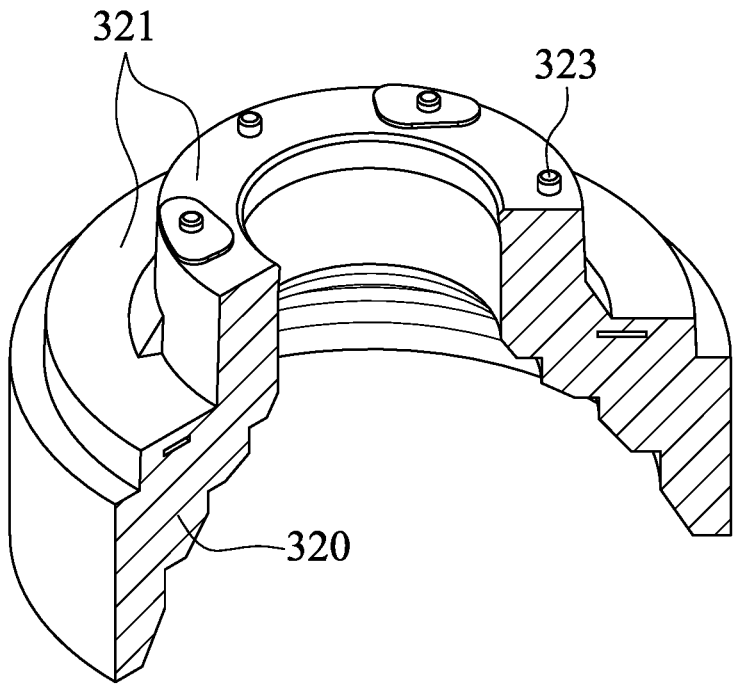
FIG. 3F is a partial cross-sectional view of the lens carrier according to the 3rd embodiment in FIG. 3A.
Figure 3G:
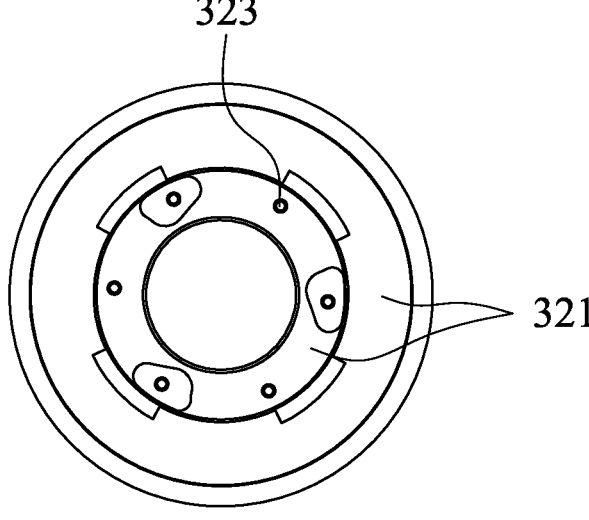
FIG. 3G is a top view of the lens carrier according to the 3rd embodiment in FIG. 3A.

FIG. 3E is a schematic view of the lens carrier 320, the lens element 360 and the holder portion 340 according to the 3rd embodiment in FIG. 3A. FIG. 3F is a partial cross-sectional view of the lens carrier 320 according to the 3rd embodiment in FIG. 3A. FIG. 3G is a top view of the lens carrier 320 according to the 3rd embodiment in FIG. 3A. In FIGS. 3C and 3E to 3G, the lens element 360 is disposed at the lens carrier 320, the lens carrier 320 has the optical axis X, and the lens carrier 320 includes an assembling structure 321 and a magnetic member 322, wherein the blade set 311 and the rotating element 312 of the rotatable component 310 are disposed on the assembling structure 321 of the lens carrier 320, and both of the blade set 311 and the rotating element 312 rotate relatively to the assembling structure 321, so that the dimension of the through hole O can be changed; the magnetic member 322 can be insert molded in the lens carrier 320, but the present disclosure is not limited thereto.

Moreover, the rotatable blades are disposed on the assembling structure 321, and the assembling structure 321 can include a plurality of positioning members 323, wherein each of the positioning members 323 is a protruding structure on the assembling structure 321 parallel to the optical axis X, the positioning members 323 are corresponding to the rotatable blades, respectively, and a relative displacement between the rotating element 312 and the positioning members 323 makes the rotatable blades rotate. Therefore, the dimension of the through hole O can be accurately controlled. Moreover, the displacement of the rotating element 312 relative to the positioning members 323 can be driven via the magnets 313 and the coil 314.

The lens carrier 320 is disposed on the holder portion 340, and the lens carrier 320 is corresponding to the imaging surface 330. In particular, the holder portion 340 has the sufficient supporting characteristic to support the lens carrier 320 so as to keep the structural strength thereof and achieve the condition of the mass production.

Figure 3H:
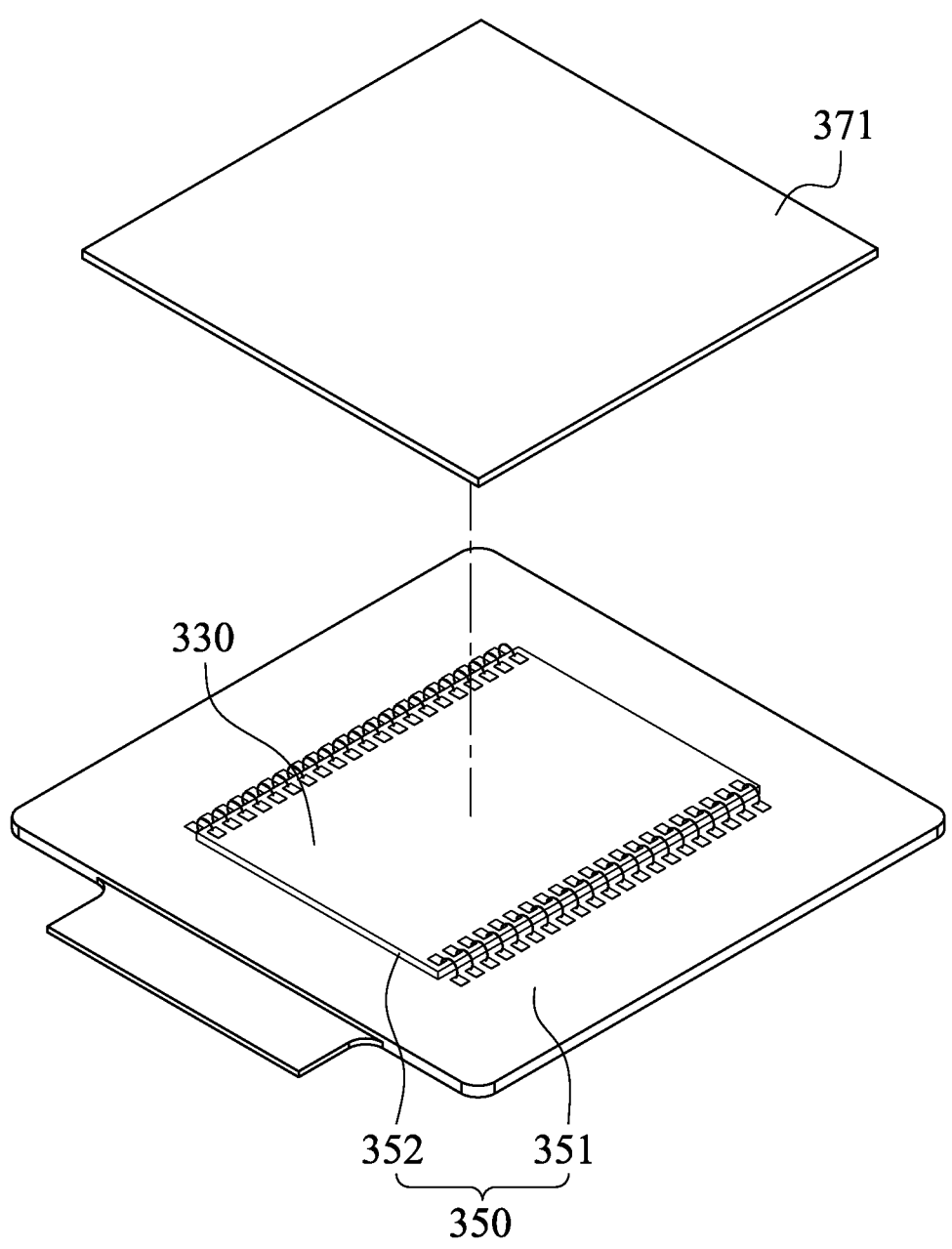
FIG. 3H is a schematic view of the filter, the imaging surface and the electronic module according to the 3rd embodiment in FIG. 3A.
Figure 3I:
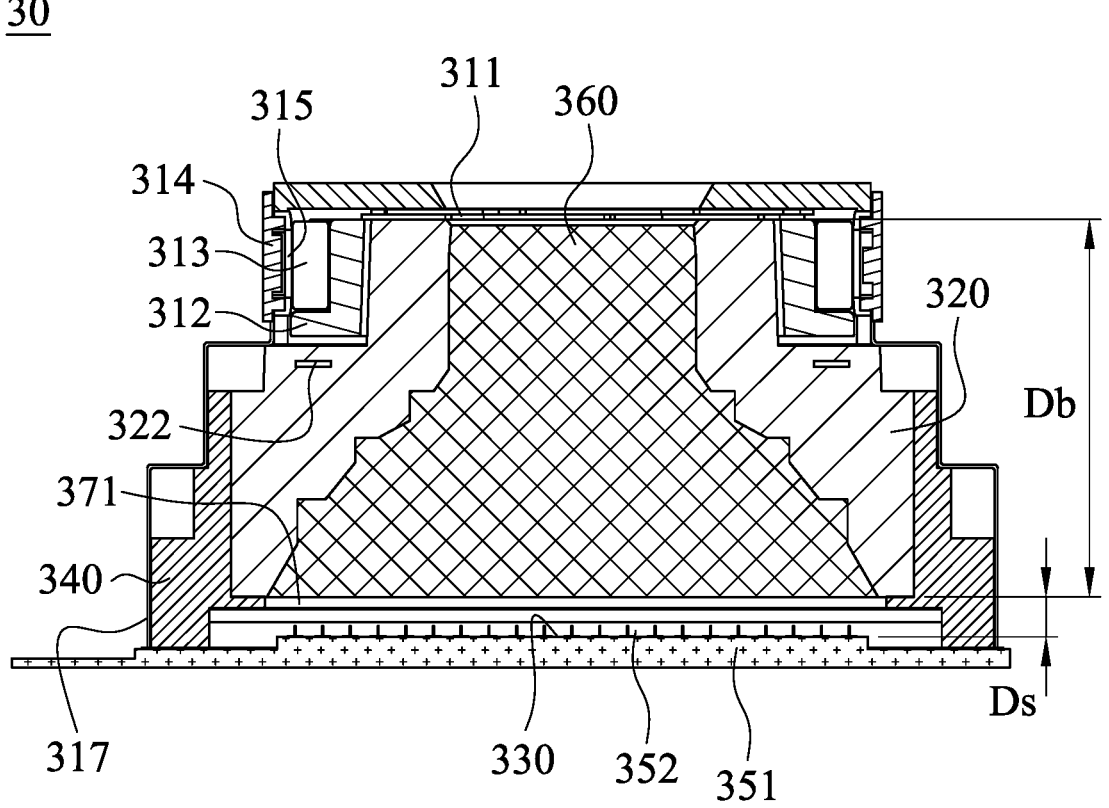
FIG. 3I is a cross-sectional view of the camera module according to the 3rd embodiment in FIG. 3A.

FIG. 3H is a schematic view of the filter 371, the imaging surface 330 and the electronic module 350 according to the 3rd embodiment in FIG. 3A. FIG. 3I is a cross-sectional view of the camera module 30 according to the 3rd embodiment in FIG. 3A. In FIGS. 3H and 3I, the filter 371 is disposed on the electronic module 350, and the electronic module 350 includes a circuit board 351 and an image sensor 352. Further, the circuit board 351 is electrically connected to the image sensor 352, the image sensor 352 is corresponding to the imaging surface 330, and a fixed distance between the lens carrier 320 and the circuit board 351 can be kept via the holder portion 340.

In FIG. 3I, when a height of the lens carrier 320 is Db, and a distance between the lens carrier 320 and the imaging surface 330 is Ds, Db/Ds is 9.45.

Figure 3J:
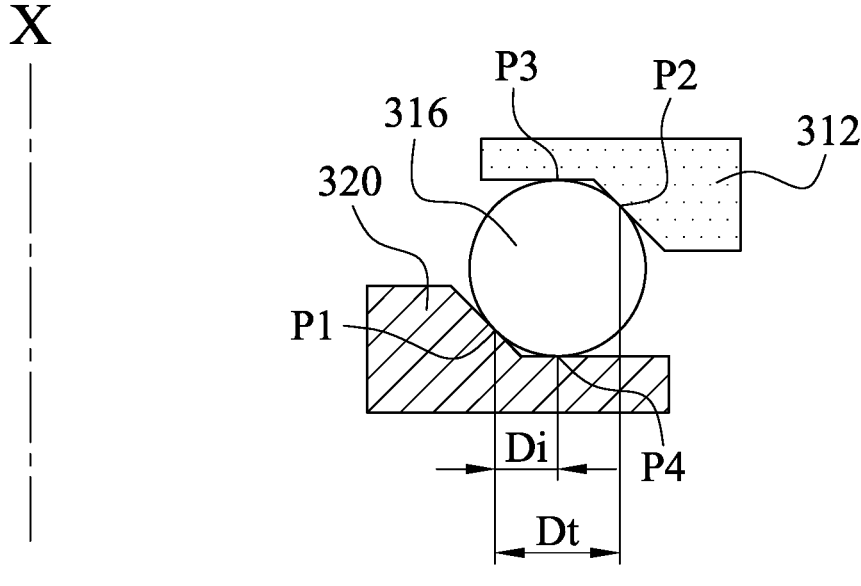
FIG. 3J is a schematic view of the bearing member contacted with the rotating element and the lens carrier according to the 1st example of the 3rd embodiment in FIG. 3D.

FIG. 3J is a schematic view of the bearing member 316 contacted with the rotating element 312 and the lens carrier 320 according to the 1st example of the 3rd embodiment in FIG. 3D. In FIG. 3J, each of the bearing members 316 can include four contacted points P1, P2, P3, P4 physically contacted with the rotating element 312 and the lens carrier 320. In detail, the contacted points P1, P2, P3, P4 include an inner contacted point, an outer contacted point, an upper contacted point and a lower contacted point, wherein the inner contacted point is one of the contacted points P1, P2, P3, P4 closest to the optical axis X, the outer contacted point is one of the contacted points P1, P2, P3, P4 farthest away from the optical axis X, the upper contacted point is one of two of the contacted points P1, P2, P3, P4 farthest away on a direction parallel to the optical axis X, and the lower contacted point is the other one of two of the contacted points P1, P2, P3, P4 farthest away on the direction parallel to the optical axis X. It should be mentioned that the contacted point P1 is the inner contacted point, the contacted point P2 is the outer contacted point, the contacted point P3 is the upper contacted point, and the contacted point P4 is the lower contacted point. In particular, the positioning alignment between the rotating element 312 and the lens carrier 320 can be obtained via the bearing members 316, so that the positioning between the elements can be maintained via the bearing members 316 during the rotating process. Hence, the radial positioning between the rotating element 312 and the lens carrier 320 can be obtained via the inner contacted point and the outer contacted point, and the axial positioning between the rotating element 312 and the lens carrier 320 can be obtained via the upper contacted point and the lower contacted point.

When along a direction vertical to the optical axis X, a distance between the inner contacted point (that is, the contacted point P1) and the outer contacted point (that is, the contacted point P2) is Dt, and a distance between the inner contacted point (that is, the contacted point P1) and the lower contacted point (that is, the contacted point P4) is Di, Di/Dt is 0.5.

Figure 3K:
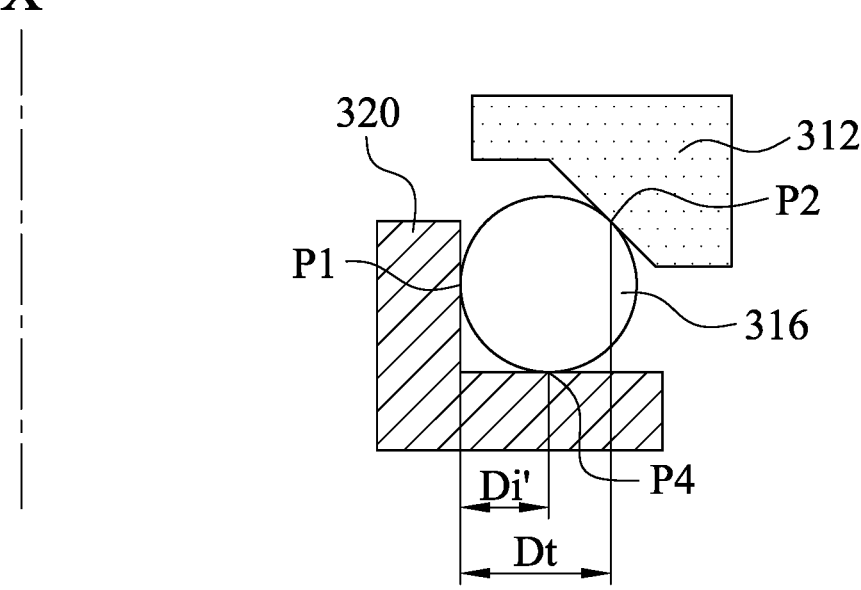
FIG. 3K is a schematic view of the bearing member contacted with the rotating element and the lens carrier according to the 2nd example of the 3rd embodiment in FIG. 3D.

FIG. 3K is a schematic view of the bearing member 316 contacted with the rotating element 312 and the lens carrier 320 according to the 2nd example of the 3rd embodiment in FIG. 3D. In FIG. 3K, each of the bearing members 316 can include three contacted points P1, P2, P4 physically contacted with the rotating element 312 and the lens carrier 320. In detail, the contacted points P1, P2, P4 include an inner contacted point, an outer contacted point, an upper contacted point and a lower contacted point, wherein the inner contacted point is one of the contacted points P1, P2, P4 closest to the optical axis X, the outer contacted point is one of the contacted points P1, P2, P4 farthest away from the optical axis X, the upper contacted point is one of two of the contacted points P1, P2, P4 farthest away on a direction parallel to the optical axis X, and the lower contacted point is the other one of the two of the contacted points P1, P2, P4 farthest away on the direction parallel to the optical axis X. It should be mentioned that the contacted point P1 is the inner contacted point, the contacted point P2 is the outer contacted point, and the contacted point P4 is the lower contacted point, wherein the contacted point P2 is simultaneously the upper contacted point according to the 2nd example of the 3rd embodiment. Hence, the radial positioning and the axial supporting between the rotating element 312 and the lens carrier 320 can be more accurate via the design of the position of the different contacted points, so that the image quality of the imaging lens assembly module can be enhanced.

When along a direction vertical to the optical axis X, a distance between the inner contacted point (that is, the contacted point P1) and the outer contacted point (that is, the contacted point P2) is Dt, and a distance between a remaining one (that is, the contacted point P4) of the contacted points P1, P2, P4 and the inner contacted point (that is, the contacted point P1) is Di', Di'/Dt is 0.59, wherein Dt according to the 2nd example of the 3rd embodiment is the distance between the inner contacted point and the outer contacted point of the contacted points P1, P2, P4.

Figure 3L:
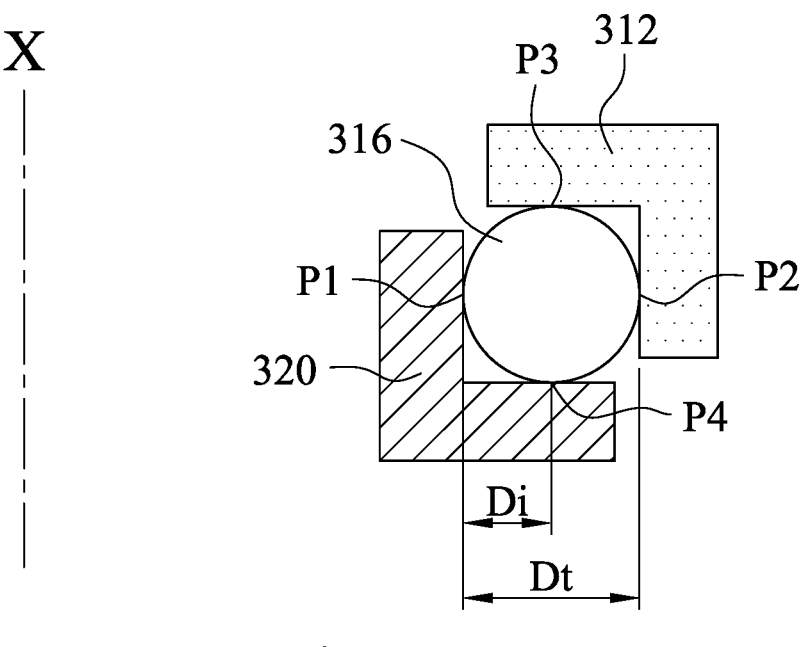
FIG. 3L is a schematic view of the bearing member contacted with the rotating element and the lens carrier according to the 3rd example of the 3rd embodiment in FIG. 3D.

FIG. 3L is a schematic view of the bearing member 316 contacted with the rotating element 312 and the lens carrier 320 according to the 3rd example of the 3rd embodiment in FIG. 3D. In FIG. 3L, each of the bearing members 316 can include four contacted points P1, P2, P3, P4, wherein the contacted point P1 is the inner contacted point, the contacted point P2 is the outer contacted point, the contacted point P3 is the upper contacted point, and the contacted point P4 is the lower contacted point. Furthermore, when along a direction vertical to the optical axis X, a distance between the inner contacted point (that is, the contacted point P1) and the outer contacted point (that is, the contacted point P2) is Dt, and a distance between the inner contacted point (that is, the contacted point P1) and the lower contacted point (that is, the contacted point P4) is Di, Di/Dt is 0.5.

Figure 3M:
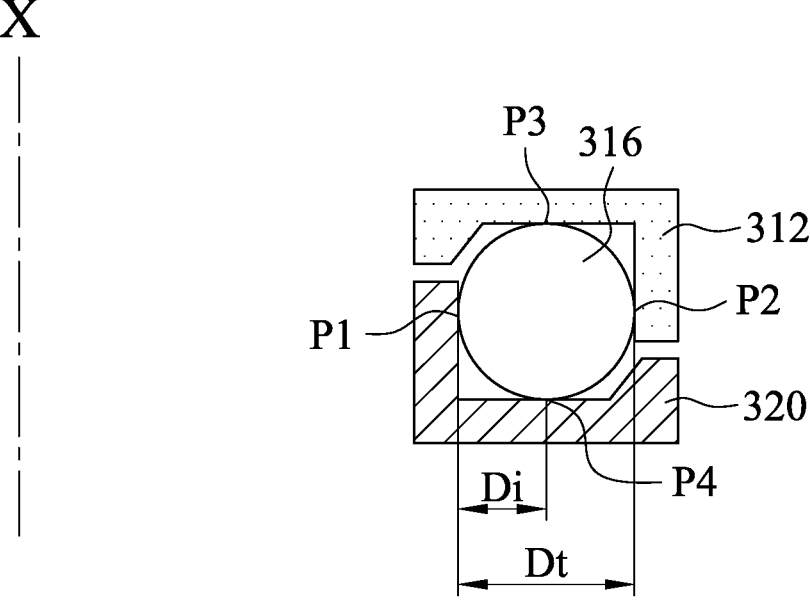
FIG. 3M is a schematic view of the bearing member contacted with the rotating element and the lens carrier according to the 4th example of the 3rd embodiment in FIG. 3D.

FIG. 3M is a schematic view of the bearing member 316 contacted with the rotating element 312 and the lens carrier 320 according to the 4th example of the 3rd embodiment in FIG. 3D. In FIG. 3M, each of the bearing members 316 can include four contacted points P1, P2, P3, P4, wherein the contacted point P1 is the inner contacted point, the contacted point P2 is the outer contacted point, the contacted point P3 is the upper contacted point, and the contacted point P4 is the lower contacted point. Furthermore, when along a direction vertical to the optical axis X, a distance between the inner contacted point (that is, the contacted point P1) and the outer contacted point (that is, the contacted point P2) is Dt, and a distance between the inner contacted point (that is, the contacted point P1) and the lower contacted point (that is, the contacted point P4) is Di, Di/Dt is 0.5.

Figure 3N:
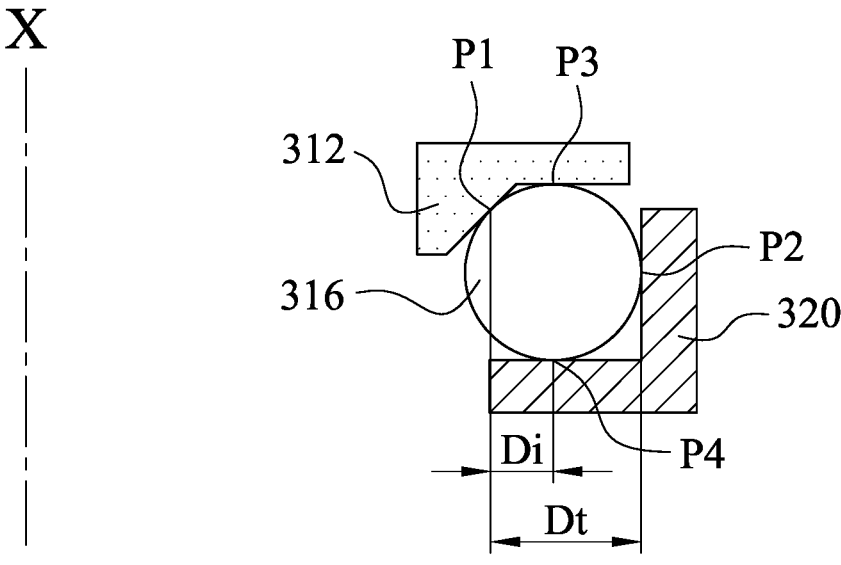
FIG. 3N is a schematic view of the bearing member contacted with the rotating element and the lens carrier according to the 5th example of the 3rd embodiment in FIG. 3D.

FIG. 3N is a schematic view of the bearing member 316 contacted with the rotating element 312 and the lens carrier 320 according to the 5th example of the 3rd embodiment in FIG. 3D. In FIG. 3N, each of the bearing members 316 can include four contacted points P1, P2, P3, P4, wherein the contacted point P1 is the inner contacted point, the contacted point P2 is the outer contacted point, the contacted point P3 is the upper contacted point, and the contacted point P4 is the lower contacted point. Furthermore, when along a direction vertical to the optical axis X, a distance between the inner contacted point (that is, the contacted point P1) and the outer contacted point (that is, the contacted point P2) is Dt, and a distance between the inner contacted point (that is, the contacted point P1) and the lower contacted point (that is, the contacted point P4) is Di, Di/Dt is 0.41.

4th Embodiment

Figure 4A:
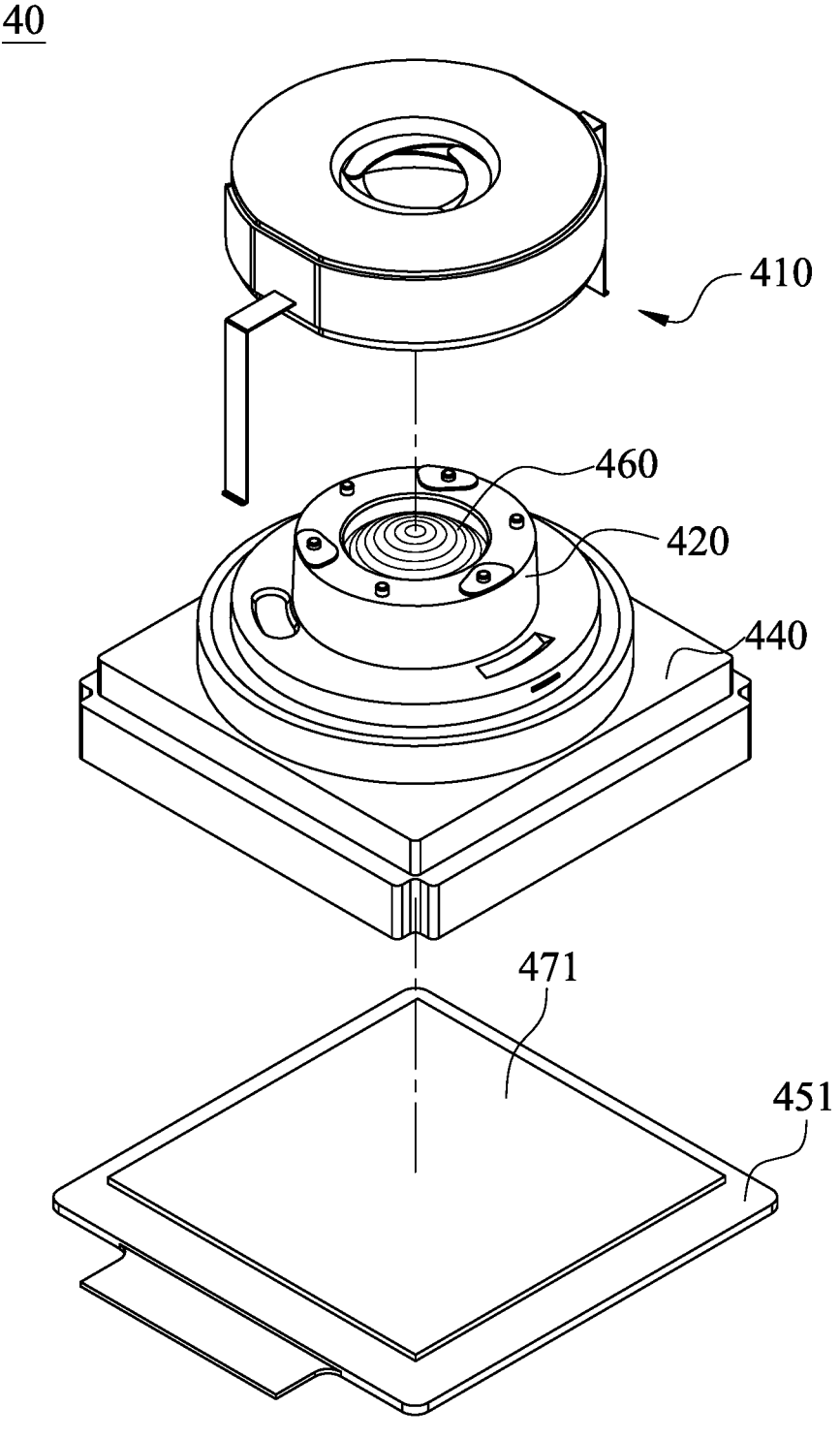
FIG. 4A is an exploded view of a camera module according to the 4th embodiment of the present disclosure.

FIG. 4A is an exploded view of a camera module 40 according to the 4th embodiment of the present disclosure. In FIG. 4A, the camera module 40 includes an imaging lens assembly module (its reference numeral is omitted) and an electronic module 450 (labeled in FIG. 4H), wherein the imaging lens assembly module includes a rotatable component 410, a lens carrier 420, an imaging surface 430 (labeled in FIG. 4H), a holder portion 440, at least one lens element 460 and a filter 471, wherein the imaging surface 430 is located on an image side of the lens carrier 420, and a fixed distance between the lens carrier 420 and the imaging surface 430 is kept via the holder portion 440, so that the fixed focus of the imaging lens assembly module can be maintained.

Figure 4B:
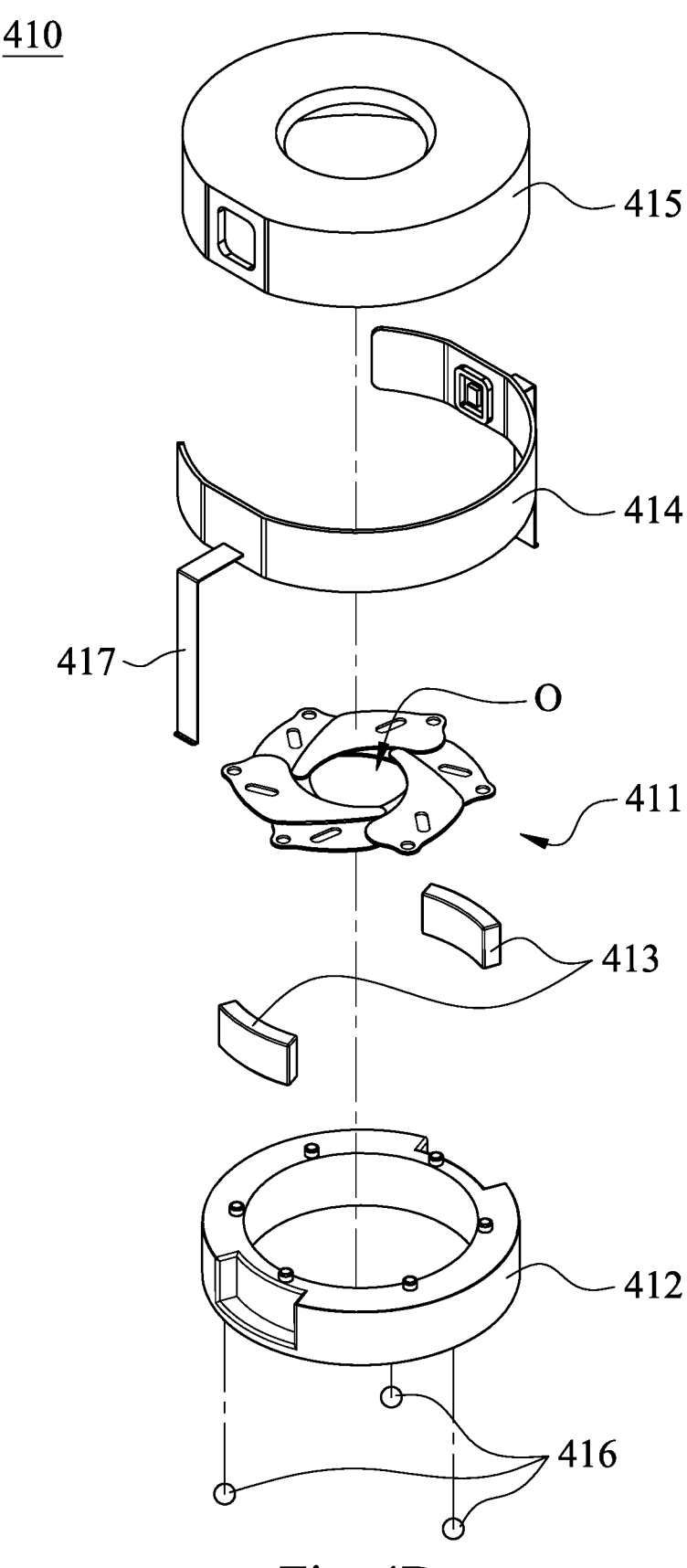
FIG. 4B is an exploded view of the rotatable component according to the 4th embodiment in FIG. 4A.
Figure 4C:
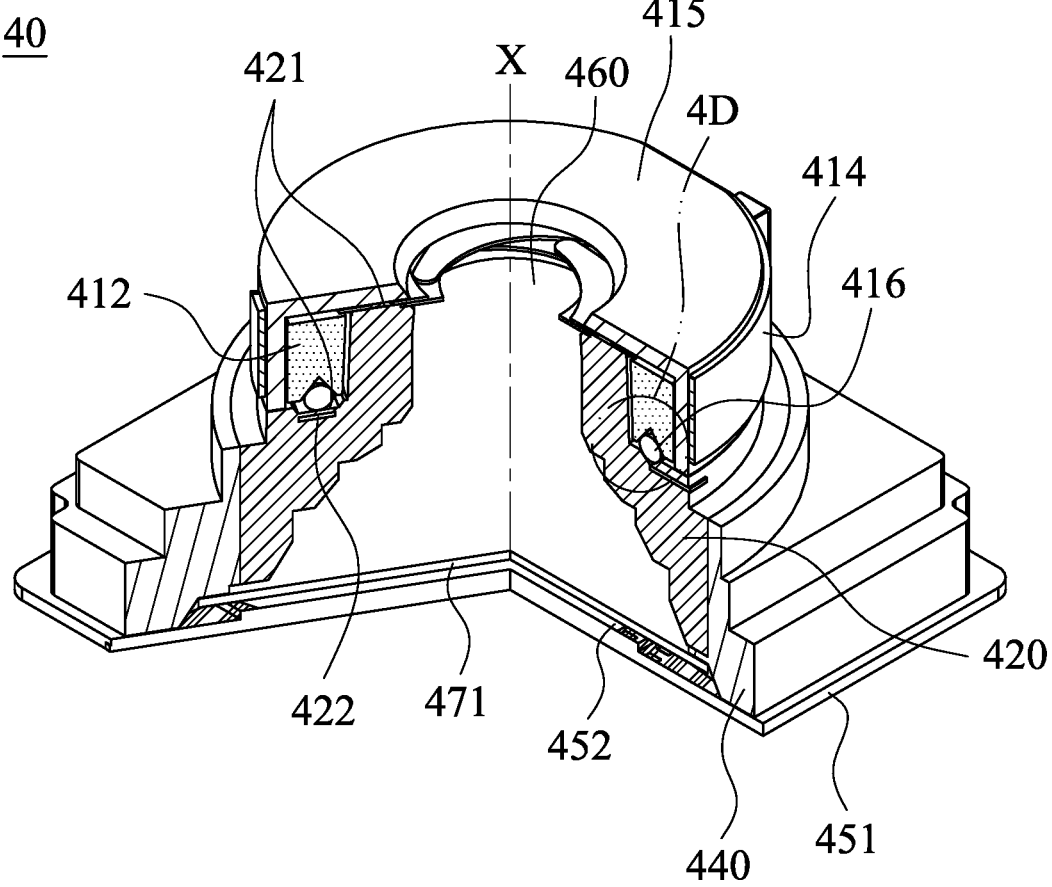
FIG. 4C is a partial cross-sectional view of the camera module according to the 4th embodiment in FIG. 4A.
Figure 4D:
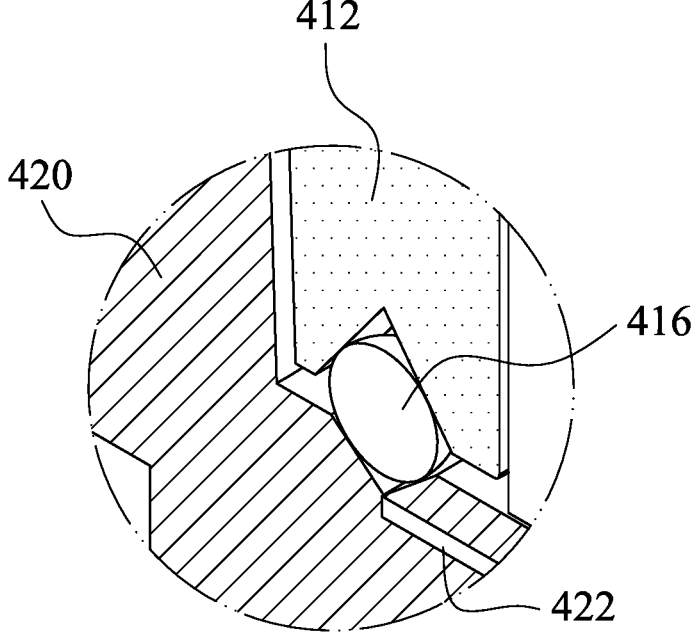
FIG. 4D is a partial enlarged view of the camera module according to the 4th embodiment in FIG. 4C.

FIG. 4B is an exploded view of the rotatable component 410 according to the 4th embodiment in FIG. 4A. FIG. 4C is a partial cross-sectional view of the camera module 40 according to the 4th embodiment in FIG. 4A. FIG. 4D is a partial enlarged view of the camera module 40 according to the 4th embodiment in FIG. 4C. In FIGS. 4B to 4D, the rotatable component 410 includes a blade set 411, a rotating element 412, a plurality of magnets 413, a coil 414, a fixer 415, a plurality of bearing members 416 and a plurality of conductive wires 417, wherein a number of the magnets 413 is two, and a number of the bearing members 416 is three. Moreover, the blade set 411 includes a plurality of rotatable blades (their reference numerals are omitted), wherein all of the rotatable blades surround an optical axis X to form a through hole O, and a dimension of the through hole O is variable. The rotating element 412 is connected to the blade set 411, and the rotating element 412 is configured to drive the blade set 411 to adjust the dimension of the through hole O. The coil 414 is corresponding to the magnets 413, and the magnets 413 are disposed on the rotating element 412. The fixer 415 is configured to accommodate the blade set 411, the rotating element 412 and the magnets 413, and the coil 414 is disposed on an outer surface of the fixer 415. The bearing members 416 are disposed between the rotating element 412 and the lens carrier 420 for supporting the rotating element 412 to rotate, and the bearing members 416 are aligned to the optical axis X for aligning to the rotating element 412 and the lens carrier 420, wherein each of the bearing members 416 can be a ball element, and the bearing members 416 are aligned to the optical axis X so as to align the rotating element 412 and the lens carrier 420, so that the rotating stability of the rotating element 412 can be enhanced. The coil 414 is electrically connected to the electronic module 450 via the conductive wire 417, wherein the conductive wire 417 can be made by the laser direct structuring, the insert molding, but the present disclosure is not limited thereto. Moreover, the through hole O is disposed on the location of the aperture of the imaging lens assembly module.

Figure 4E:
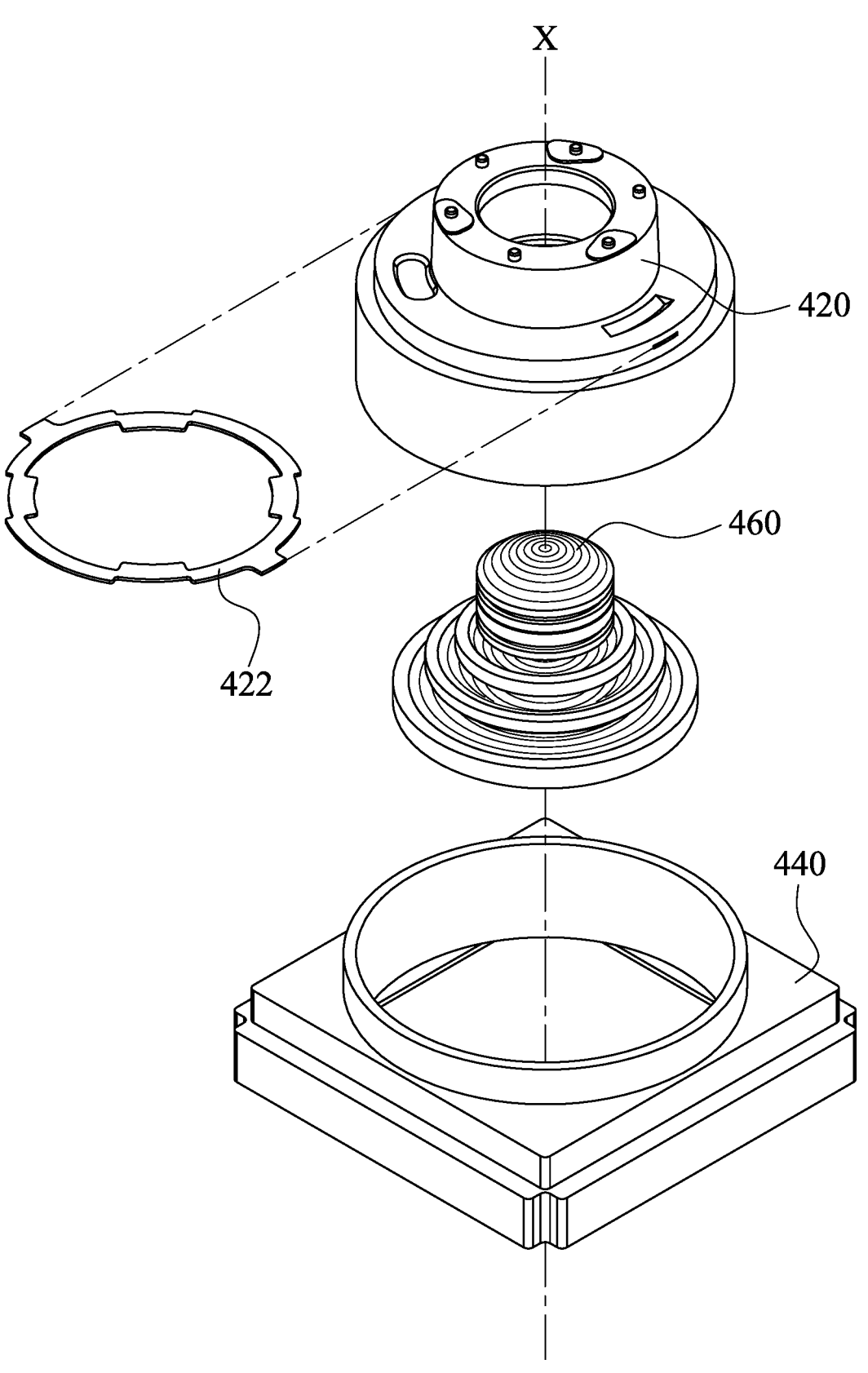
FIG. 4E is a schematic view of the lens carrier, the lens element and the holder portion according to the 4th embodiment in FIG. 4A.
Figure 4F:
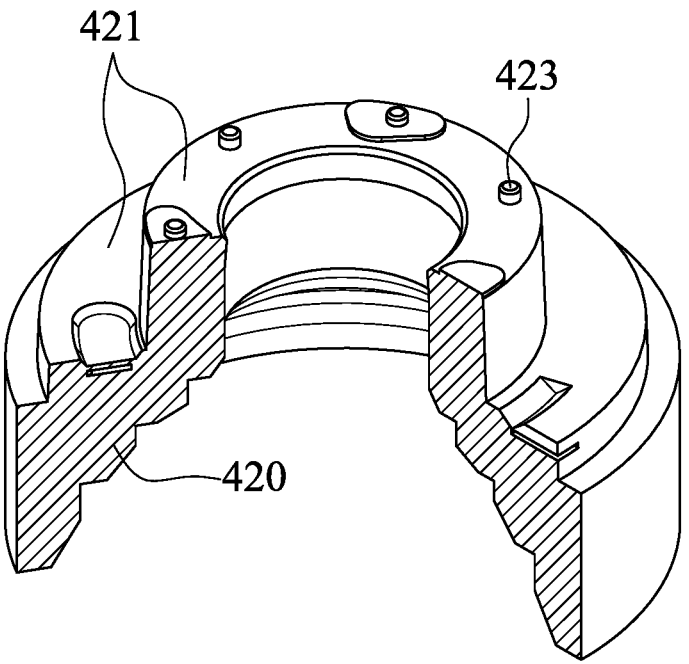
FIG. 4F is a partial cross-sectional view of the lens carrier according to the 4th embodiment in FIG. 4A.
Figure 4G:
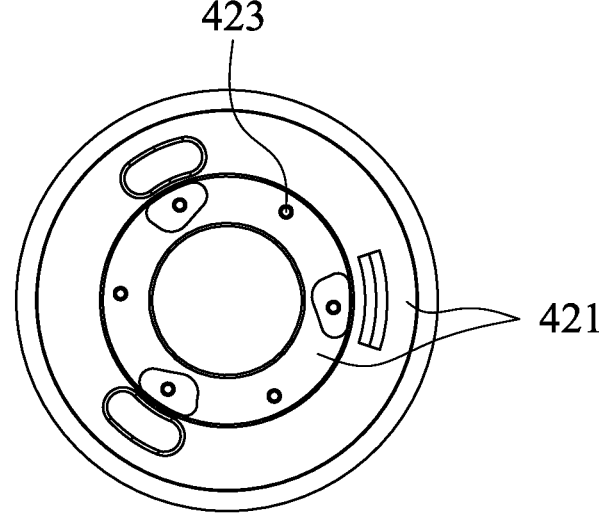
FIG. 4G is a top view of the lens carrier according to the 4th embodiment in FIG. 4A.

FIG. 4E is a schematic view of the lens carrier 420, the lens element 460 and the holder portion 440 according to the 4th embodiment in FIG. 4A. FIG. 4F is a partial cross-sectional view of the lens carrier 420 according to the 4th embodiment in FIG. 4A. FIG. 4G is a top view of the lens carrier 420 according to the 4th embodiment in FIG. 4A. In FIGS. 4C and 4E to 4G, the lens element 460 is disposed at the lens carrier 420, the lens carrier 420 has the optical axis X, and the lens carrier 420 includes an assembling structure 421 and a magnetic member 422, wherein the blade set 411 and the rotating element 412 of the rotatable component 410 are disposed on the assembling structure 421 of the lens carrier 420, and both of the blade set 411 and the rotating element 412 rotate relatively to the assembling structure 421, so that the dimension of the through hole O can be changed; the magnetic member 422 can be insert molded in the lens carrier 420, but the present disclosure is not limited thereto.

Moreover, the rotatable blades are disposed on the assembling structure 421, and the assembling structure 421 can include a plurality of positioning members 423, wherein each of the positioning members 423 is a protruding structure on the assembling structure 421 parallel to the optical axis X, the positioning members 423 are corresponding to the rotatable blades, respectively, and a relative displacement between the rotating element 412 and the positioning members 423 makes the rotatable blades rotate. Therefore, the dimension of the through hole O can be accurately controlled. Moreover, the displacement of the rotating element 412 relative to the positioning members 423 can be driven via the magnets 413 and the coil 414.

The lens carrier 420 is disposed on the holder portion 440, and the lens carrier 420 is corresponding to the imaging surface 430. In particular, the holder portion 440 has the sufficient supporting characteristic to support the lens carrier 420 so as to keep the structural strength thereof and achieve the condition of the mass production.

Figure 4H:
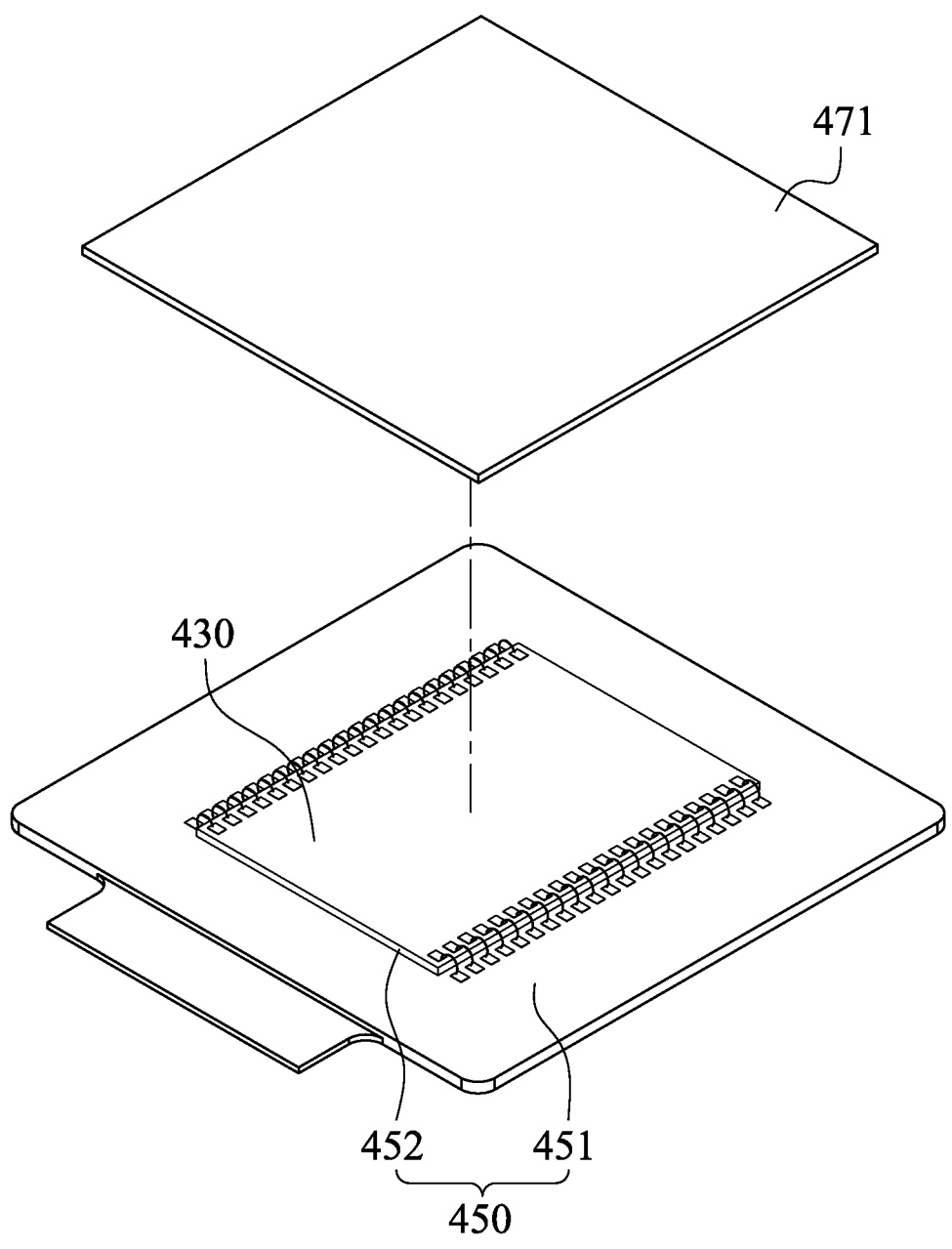
FIG. 4H is a schematic view of the filter, the imaging surface and the electronic module according to the 4th embodiment in FIG. 4A.
Figure 4I:
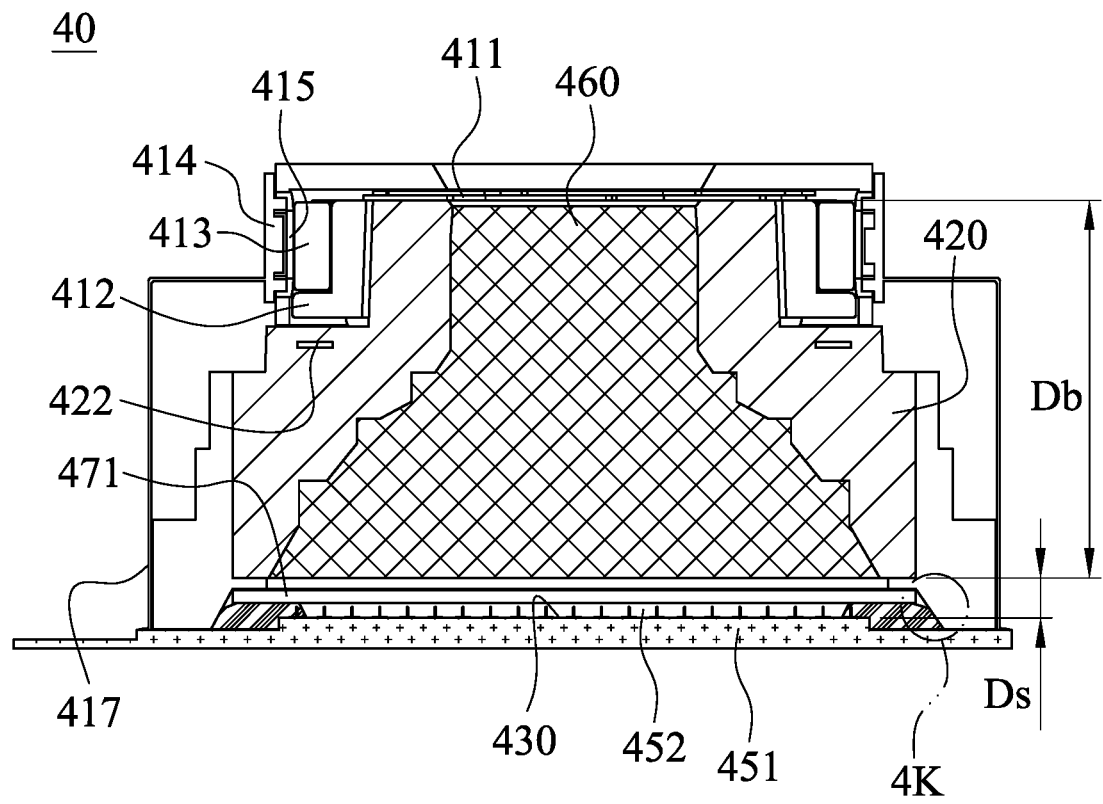
FIG. 4I is a cross-sectional view of the camera module according to the 4th embodiment in FIG. 4A.

FIG. 4H is a schematic view of the filter 471, the imaging surface 430 and the electronic module 450 according to the 4th embodiment in FIG. 4A. FIG. 4I is a cross-sectional view of the camera module 40 according to the 4th embodiment in FIG. 4A. In FIGS. 4H and 4I, the filter 471 is disposed on the electronic module 450, and the electronic module 450 includes a circuit board 451 and an image sensor 452. Further, the circuit board 451 is electrically connected to the image sensor 452, the image sensor 452 is corresponding to the imaging surface 430, and a fixed distance between the lens carrier 420 and the circuit board 451 can be kept via the holder portion 440.

Figure 4J:
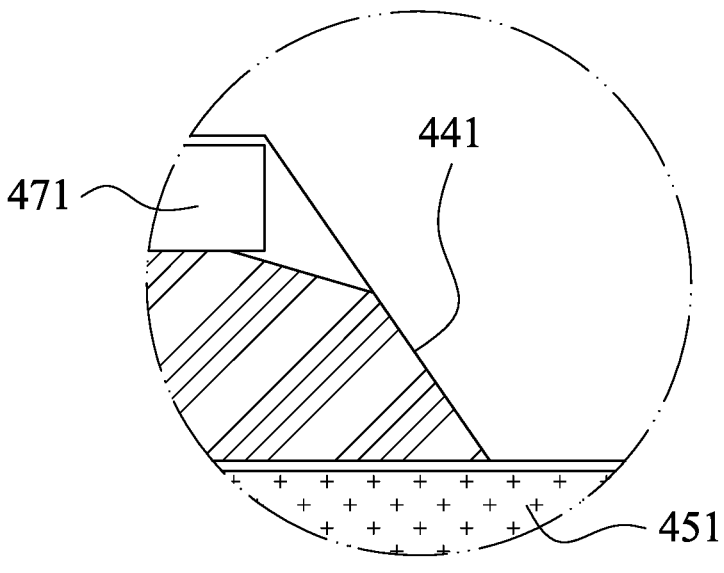
FIG. 4J is a partial enlarged view of the camera module according to the 4th embodiment in FIG. 4I.

FIG. 4J is a partial enlarged view of the camera module 40 according to the 4th embodiment in FIG. 4I. In FIG. 4J, the holder portion 440 includes an alignment structure 441, wherein an alignment between the holder portion 440 and the imaging surface 430 is obtained via the alignment structure 441. Hence, the radial positioning and the axial support between the holder portion 440 and the imaging surface 430 can be more accurate, so that the image quality of the imaging lens assembly module can be enhanced.

In FIG. 4I, when a height of the lens carrier 420 is Db, and a distance between the lens carrier 420 and the imaging surface 430 is Ds, Db/Ds is 9.45.

5th Embodiment

Figure 5A:
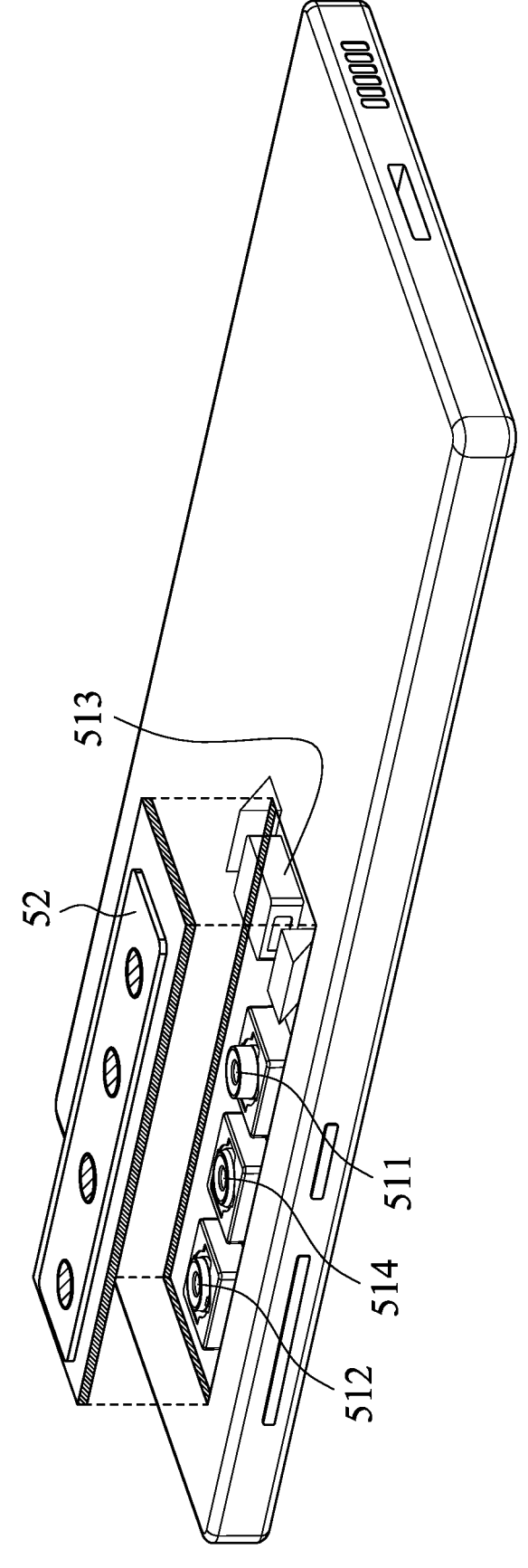
FIG. 5A is a schematic view of an electronic device according to the 5th embodiment of the present disclosure.
Figure 5B:
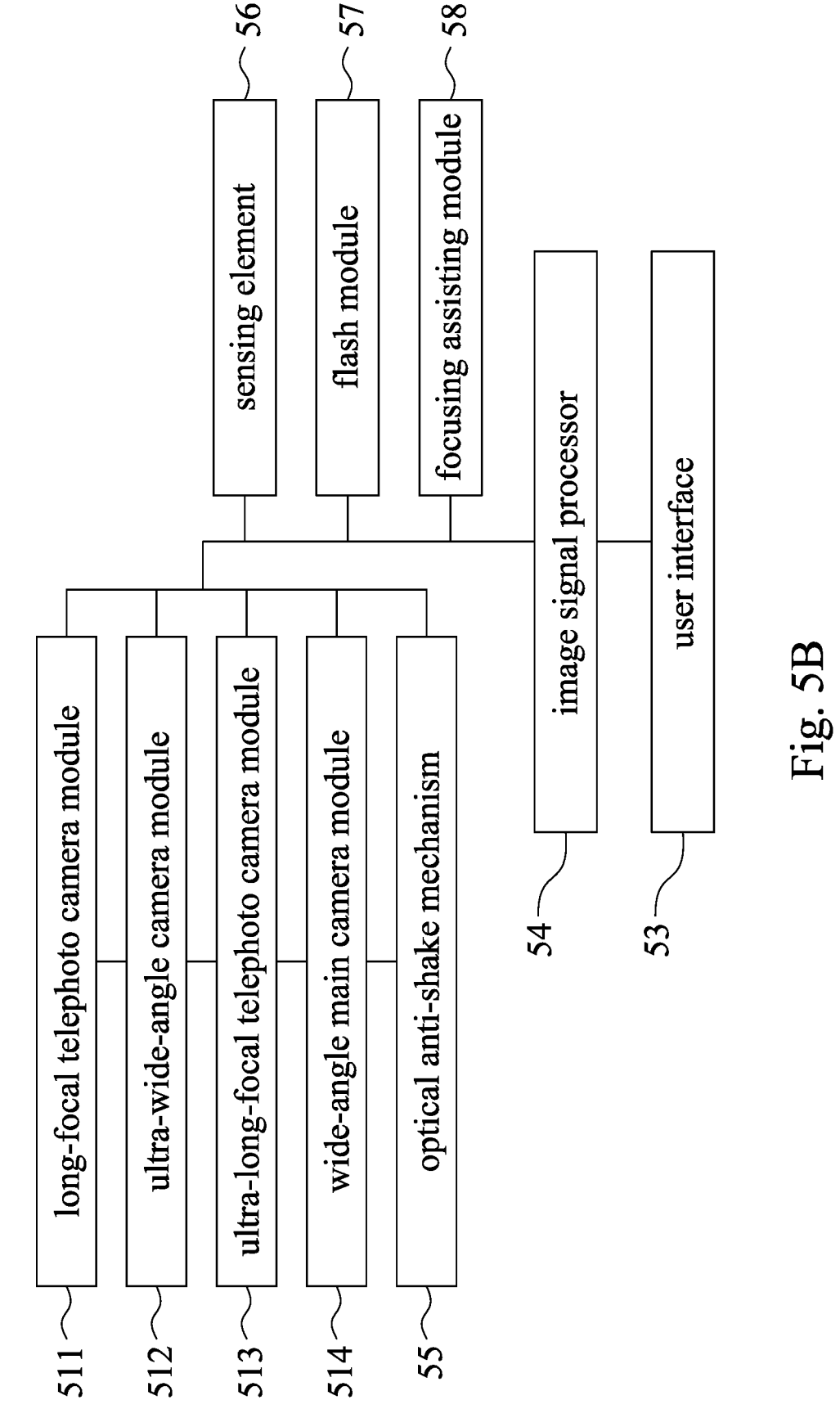
FIG. 5B is a block diagram of the electronic device according to the 5th embodiment in FIG. 5A.

FIG. 5A is a schematic view of an electronic device 50 according to the 5th embodiment of the present disclosure. FIG. 5B is a block diagram of the electronic device 50 according to the 5th embodiment in FIG. 5A. In FIGS. 5A and 5B, the electronic device 50 according to the 5th embodiment is a smart phone, and includes four camera modules, wherein the camera modules are a long-focal telephoto camera module 511, an ultra-wide-angle camera module 512, an ultra-long-focal telephoto camera module 513 and a wide-angle main camera module 514. Moreover, each of the camera modules includes an imaging lens assembly module (not shown) and an electronic module (not shown).

In detail, the function of optical zoom of the electronic device 50 can be obtained by switching the camera modules with the different visual angles. It should be mentioned that a lens cover 52 is only configured to indicate the long-focal telephoto camera module 511, the ultra-wide-angle camera module 512, the ultra-long-focal telephoto camera module 513 and the wide-angle main camera module 514 disposed in the electronic device 50, and the schematic view is not configured to mean that the lens cover 52 is removable. In particular, the imaging lens assembly module according to the 5th embodiment can be one of the imaging lens assembly module according to the aforementioned 1st embodiment to the 4th embodiment, but the present disclosure is not limited thereto.

The electronic device 50 further includes a user interface 53, wherein the user interface 53 can be a touch screen or a display screen, but the present disclosure is not limited thereto.

Moreover, users enter a shooting mode via the user interface 53 of the electronic device 50. At this moment, the imaging light is gathered on an image sensor (not shown) of the electronic module via the long-focal telephoto camera module 511, the ultra-wide-angle camera module 512, the ultra-long-focal telephoto camera module 513 and the wide-angle main camera module 514, and an electronic signal about an image is output to an image signal processor (ISP) 54.

To meet a specification of the electronic device 50, the electronic device 50 can further include an optical anti-shake mechanism 55, which can be an optical image stabilization (OIS). Furthermore, the electronic device 50 can further include at least one auxiliary optical element (its reference numeral is omitted) and at least one sensing element 56. According to the 5th embodiment, the auxiliary optical element is a flash module 57 and a focusing assisting module 58. The flash module 57 can be for compensating a color temperature, and the focusing assisting module 58 can be an infrared distance measurement component, a laser focus module, etc. The sensing element 56 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 55 disposed on the camera module (that is, the long-focal telephoto camera module 511, the ultra-wide-angle camera module 512, the ultra-long-focal telephoto camera module 513, the wide-angle main camera module 514) of the electronic device 50 can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 50 can further include, but not be limited to, a display, a control unit, a storage unit, a random access memory (RAM), a read-only memory (ROM), or the combination thereof.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly module, comprising:
   a lens carrier having an optical axis, wherein at least one lens element of the imaging lens assembly module is disposed at the lens carrier, and the lens carrier comprises an assembling structure;
   a rotatable component, comprising:
   a blade set comprising a plurality of rotatable blades, wherein all of the rotatable blades surround the optical axis to form a through hole, and a dimension of the through hole is variable;
   a rotating element connected to the blade set, and the rotating element configured to drive the blade set to adjust the dimension of the through hole; and
   at least two bearing members disposed between the rotating element and the lens carrier for supporting the rotating element to rotate, and the at least two bearing members aligned to the optical axis for aligning to the rotating element and the lens carrier, wherein each of the bearing members comprises:

four contacted points physically contacted with the rotating element or the lens carrier, and the contacted points comprising:

an inner contacted point being one of the contacted points closest to the optical axis;

an outer contacted point being one of the contacted points farthest away from the optical axis;

an upper contacted point being one of two of the contacted points farthest away on a direction parallel to the optical axis; and a lower contacted point being the other one of the two of the contacted points farthest away on the direction parallel to the optical axis;

an imaging surface located on an image side of the lens carrier; and a holder portion configured to keep a fixed distance between the lens carrier and the imaging surface;

wherein the blade set of the rotatable component and the rotating element are disposed on the assembling structure of the lens carrier, and both of the blade set and the rotating element rotate relatively to the assembling structure, so that the dimension of the through hole is variable;

wherein the through hole is disposed on an object side of the lens carrier.

2. The imaging lens assembly module of claim 1, wherein the rotatable blades are disposed on the assembling structure, the assembling structure comprises a plurality of positioning members, each of the positioning members is a protruding structure on the assembling structure parallel to the optical axis, the positioning members are corresponding to the rotatable blades, respectively, and a relative displacement between the rotating element and the positioning members makes the rotatable blades rotate.

3. The imaging lens assembly module of claim 1, wherein the lens carrier and the holder portion are integrally formed and corresponding to the imaging surface.

4. The imaging lens assembly module of claim 1, wherein the lens carrier is disposed on the holder portion and corresponding to the imaging surface.

5. The imaging lens assembly module of claim 1, wherein the holder portion comprises an alignment structure, and an alignment between the holder portion and the imaging surface is obtained via the alignment structure.

6. The imaging lens assembly module of claim 1, wherein an outer portion of the lens carrier comprises the assembling structure, an inner portion of the lens carrier comprises a receiving structure, the imaging lens assembly module further comprises a first lens element and a second lens element, and both of the first lens element and the second lens element are disposed on the receiving structure;

wherein the first lens element is disposed on the receiving structure which is farther away from an upper surface of the imaging surface, and the second lens element is disposed on the receiving structure which is closer to a lower surface of the imaging surface.

7. The imaging lens assembly module of claim 6, wherein the first lens element is made of glass material.

8. The imaging lens assembly module of claim 1, wherein the rotatable component further comprises:

a magnet; and a coil corresponding to the magnet, and one of the magnet and the coil disposed on the rotating element.

9. The imaging lens assembly module of claim 1, wherein a number of the at least two bearing members is not larger than five.

10. The imaging lens assembly module of claim 1, wherein along a direction vertical to the optical axis, a distance between the inner contacted point and the outer contacted point is Dt, a distance between the inner contacted point and the lower contacted point is Di, and the following condition is satisfied:

$$0.3 \leq Di/Dt \leq 0.7.$$

11. The imaging lens assembly module of claim 1, wherein a height of the lens carrier is Db, a distance between the lens carrier and the imaging surface is Ds, and the following condition is satisfied:

$$1.5 < Db/Ds \leq 30.7.$$

12. The imaging lens assembly module of claim 8, wherein a height of the lens carrier is Db, a distance between the lens carrier and the imaging surface is Ds, and the following condition is satisfied:

$$1.5 < Db/Ds \leq 30.7.$$

13. The imaging lens assembly module of claim 1, wherein an aperture value of the imaging lens assembly module is FNO, and the following condition is satisfied:

$$0.9 \leq FNO \leq 5.6.$$

14. The imaging lens assembly module of claim 1, wherein a maximum field of view of the imaging lens assembly module is FOV, and the following condition is satisfied:

$$50 \text{ degrees} \leq FOV \leq 105 \text{ degrees.}$$

15. A camera module, comprising:

the imaging lens assembly module of claim 1; and an image sensor corresponding to the imaging surface.

16. A camera module, comprising:

an imaging lens assembly module, comprising:

a lens carrier having an optical axis, wherein at least one lens element of the imaging lens assembly module is disposed at the lens carrier, and the lens carrier comprises an assembling structure;

a rotatable component, comprising:

a blade set comprising a plurality of rotatable blades, wherein all of the rotatable blades surround the optical axis to form a through hole, and a dimension of the through hole is variable;

a rotating element connected to the blade set, and the rotating element configured to drive the blade set to adjust the dimension of the through hole; and at least two bearing members disposed between the rotating element and the lens carrier for supporting the rotating element to rotate, and the at least two bearing members aligned to the optical axis for aligning to the rotating element and the lens carrier, wherein each of the bearing members comprises:

three contacted points physically contacted with the rotating element or the lens carrier, and the contacted points comprising:

an inner contacted point being one of the contacted points closest to the optical axis;

an outer contacted point being one of the contacted points farthest away from the optical axis;

an upper contacted point being one of two of the contacted points farthest away on a direction parallel to the optical axis; and a lower contacted point being the other one of the two of the contacted points farthest away on the direction parallel to the optical axis;

an imaging surface located on an image side of the lens carrier; and a holder portion; and an electronic module comprising a circuit board and an image sensor, the circuit board electrically connected to the image sensor, and the image sensor corresponding to the imaging surface;

wherein the blade set of the rotatable component and the rotating element are disposed on the assembling structure of the lens carrier, and both of the blade set and the rotating element rotate relatively to the assembling structure, so that the dimension of the through hole is variable;

wherein a fixed distance between the lens carrier and the circuit board is kept via the holder portion;

wherein one of the contacted points is simultaneously one of the inner contacted point and the outer contacted point and one of the upper contacted point and the lower contacted point.

17. The camera module of claim 16, wherein the rotatable blades are disposed on the assembling structure, the assembling structure comprises a plurality of positioning members, each of the positioning members is a protruding structure on the assembling structure parallel to the optical axis, the positioning members are corresponding to the rotatable blades, respectively, and a relative displacement between the rotating element and the positioning members makes the rotatable blades rotate.

18. The camera module of claim 16, wherein the lens carrier and the holder portion are integrally formed and assembled on the electronic module.

19. The camera module of claim 16, wherein an outer portion of the lens carrier comprises the assembling structure, an inner portion of the lens carrier comprises a receiving structure, the imaging lens assembly module further comprises a first lens element and a second lens element, and both of the first lens element and the second lens element are disposed on the receiving structure;

wherein the first lens element is disposed on the receiving structure which is farther away from an upper surface of the imaging surface, and the second lens element is disposed on the receiving structure which is closer to a lower surface of the imaging surface.

20. The camera module of claim 16, wherein the rotatable component further comprises:

a magnet; and a coil corresponding to the magnet, and one of the magnet and the coil disposed on the rotating element.

21. The camera module of claim 16, wherein a number of the at least two bearing members is not larger than five.

22. The camera module of claim 16, wherein along a direction vertical to the optical axis, a distance between the inner contacted point and the outer contacted point is Dt, a distance between a remaining one of the contacted points and the inner contacted point is Di', and the following condition is satisfied:

$$0.3 \le Di'/Dt \le 0\ 0.7.$$

23. The camera module of claim 16, wherein an aperture value of the imaging lens assembly module is FNO, and the following condition is satisfied:

$$0.9 \le FNO \le 5.6.$$

24. The camera module of claim 16, wherein a maximum field of view of the imaging lens assembly module is FOV, and the following condition is satisfied:

$$50\ \text{degrees} \le FOV \le 105\ \text{degrees}.$$

25. The camera module of claim 16, wherein the holder portion comprises an alignment structure, and an alignment between the holder portion and the circuit board is obtained via the alignment structure.

26. An electronic device, comprising:

the camera module of claim 16.

* * * * *